United States Patent
Morimoto et al.

(10) Patent No.: US 8,155,502 B2
(45) Date of Patent: Apr. 10, 2012

(54) INFORMATION PROCESSING APPARATUS, INFORMATION PROCESSING METHOD, AND COMPUTER PROGRAM

(75) Inventors: Naoki Morimoto, Tokyo (JP); Kenichiro Aridome, Kanagawa (JP); Yukio Isobe, Kanagawa (JP); Atsushi Mae, Kanagawa (JP)

(73) Assignee: Sony Corporation, Tokyo (JP)

( * ) Notice: Subject to any disclaimer, the term of this patent is extended or adjusted under 35 U.S.C. 154(b) by 1073 days.

(21) Appl. No.: 11/994,063

(22) PCT Filed: Apr. 10, 2007

(86) PCT No.: PCT/JP2007/057909
§ 371 (c)(1),
(2), (4) Date: Dec. 27, 2007

(87) PCT Pub. No.: WO2007/129524
PCT Pub. Date: Nov. 15, 2007

(65) Prior Publication Data
US 2009/0129738 A1    May 21, 2009

(30) Foreign Application Priority Data
May 10, 2006    (JP) ................... 2006-132005

(51) Int. Cl.
*H04N 9/80* (2006.01)
(52) U.S. Cl. .................................... 386/248
(58) Field of Classification Search ............... 386/248
See application file for complete search history.

(56) References Cited

U.S. PATENT DOCUMENTS

| | | | |
|---|---|---|---|
| 6,289,166 B1 * | 9/2001 | Uno et al. | 386/329 |
| 6,678,332 B1 * | 1/2004 | Gardere et al. | 375/240.26 |
| 6,792,047 B1 * | 9/2004 | Bixby et al. | 375/240.26 |
| 6,795,383 B1 * | 9/2004 | Yamamoto et al. | 369/47.16 |
| 6,819,862 B1 * | 11/2004 | Uno et al. | 386/241 |
| 7,096,481 B1 * | 8/2006 | Forecast et al. | 725/32 |
| 7,106,946 B1 * | 9/2006 | Kato | 386/241 |

(Continued)

FOREIGN PATENT DOCUMENTS
EP    1 494 472 A1    1/2005
(Continued)

OTHER PUBLICATIONS

Extended Search Report issued May 25, 2011 in Europe Application No. 07741345.8.

(Continued)

*Primary Examiner* — David García Cervetti
(74) *Attorney, Agent, or Firm* — Oblon, Spivak, McClelland, Maier & Neustadt, L.L.P.

(57) ABSTRACT

An AV stream stored on a recording medium is edited in such a manner as to not conflict with a play-only standard format. When an intermediate portion of a stream file is to be deleted, the original clip AV stream file is divided at a deletion section, and a single ATC is provided for each file. When a play item is to be deleted in an intermediate portion of a playlist, the setting of seamless play with the immediately preceding play item is released in the final play item on the forward side, which is left after deletion is performed, and the setting of seamless play with the immediately preceding play item is released in the clip information file at the beginning on the backward side, which is left after deletion is performed.

17 Claims, 22 Drawing Sheets

U.S. PATENT DOCUMENTS

| | | | |
|---|---|---|---|
| 7,155,112 B2 * | 12/2006 | Uno et al. | 386/248 |
| 7,159,244 B2 * | 1/2007 | Matsushima et al. | 726/30 |
| 7,236,687 B2 * | 6/2007 | Kato et al. | 386/248 |
| 7,477,833 B2 * | 1/2009 | Kato et al. | 386/241 |
| 7,580,613 B2 * | 8/2009 | Kato et al. | 386/248 |
| 7,646,967 B2 * | 1/2010 | Kato et al. | 386/248 |
| 7,738,776 B2 * | 6/2010 | Kato et al. | 386/241 |
| 7,913,169 B2 * | 3/2011 | Yahata et al. | 715/700 |
| 7,925,138 B2 * | 4/2011 | Ando et al. | 386/240 |
| 7,941,033 B2 * | 5/2011 | Kato et al. | 386/248 |
| 2002/0135607 A1 * | 9/2002 | Kato et al. | 345/716 |
| 2002/0145702 A1 * | 10/2002 | Kato et al. | 352/1 |
| 2002/0150383 A1 * | 10/2002 | Kato et al. | 386/69 |
| 2002/0164152 A1 * | 11/2002 | Kato et al. | 386/95 |
| 2003/0103604 A1 * | 6/2003 | Kato et al. | 379/68 |
| 2004/0019614 A1 * | 1/2004 | Wang | 707/202 |
| 2004/0234249 A1 * | 11/2004 | Uno et al. | 386/95 |
| 2004/0255250 A1 | 12/2004 | Tsukamoto | |
| 2005/0265700 A1 * | 12/2005 | Kato | 386/111 |
| 2009/0271586 A1 * | 10/2009 | Shaath | 711/163 |

FOREIGN PATENT DOCUMENTS

| | | |
|---|---|---|
| EP | 1 596 396 A1 | 11/2005 |
| JP | 2001-157145 | 6/2001 |
| JP | 2001 157145 | 6/2001 |
| JP | 2003 6979 | 1/2003 |
| JP | 2003-6979 | 1/2003 |
| JP | 2005-12256 | 1/2005 |
| JP | 2005-149658 | 6/2005 |
| WO | WO 02/075739 A1 | 9/2002 |

OTHER PUBLICATIONS

AVCHD Format Co-Promoters: "Guide to obtain AVCHD Specification and Logo License", AVCHD Information Website, URL http://www.avchd-info.org/license/index.html [Retrieved on Dec. 16, 2006], XP-002634818, Jul. 19, 2006, pp. 1-5.

AVCHD Format Co-Promoters: "Press Release. AVCHD Basic Specifications", AVCHD Information Website, URL http://www.avchd-info.org/press/20060511.html [Retrieved on Dec. 16, 2006, XP-002634819, May 11, 2006. pp. 1-2.

AVCHD Format Co-Promoters: "Press Release: AVCHD Expanded Format and Commence Licensing", AVCHD Information Website, URL http://www.avchd-info.org/press/20060713.html [Retrieved on Dec. 16, 2010], XP-002634820, Jul. 13, 2006, pp. 1-2.

AVCHD Format Co-Promoters: "AVCHD Format Specification Overview", AVCHD Information Website, URL http://www.avchd-info.org/format/index.html [Retrieved on Dec. 16, 2010], XP-002634821, Sep. 15, 2007, 1 page.

* cited by examiner

FIG. 15
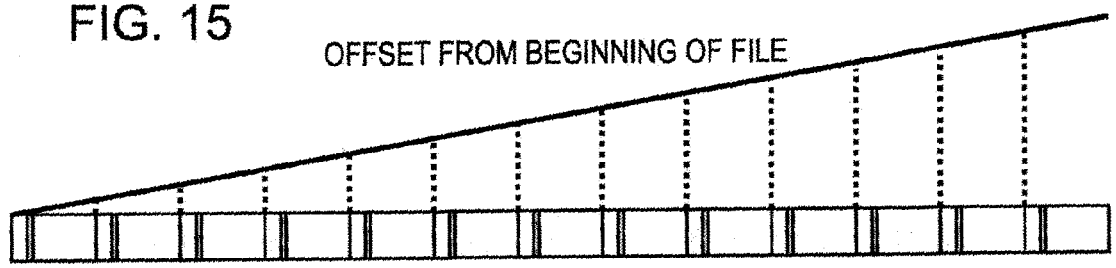
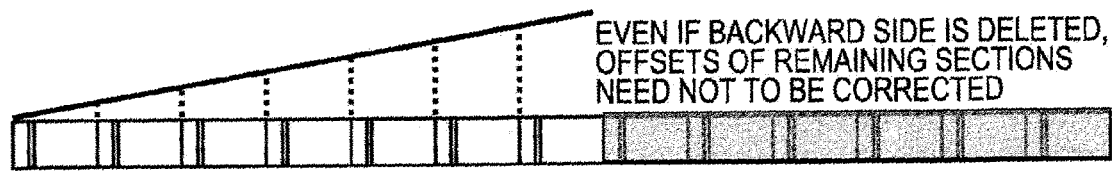
FIG. 16
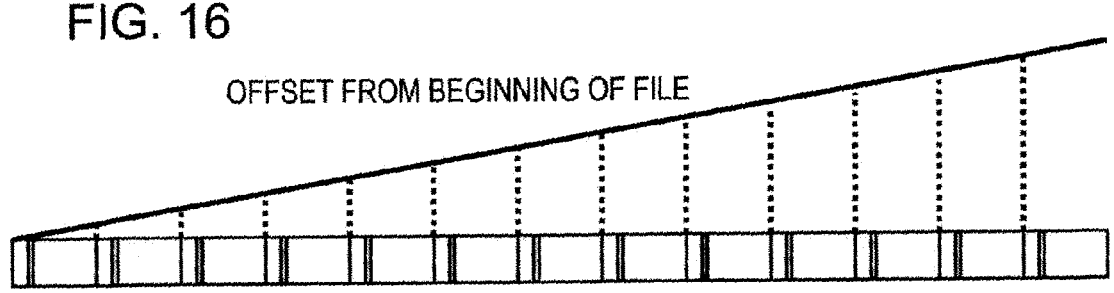
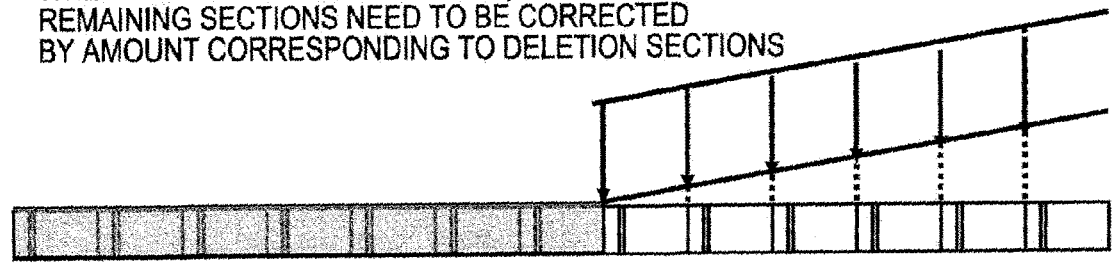

INFORMATION PROCESSING APPARATUS, INFORMATION PROCESSING METHOD, AND COMPUTER PROGRAM

TECHNICAL FIELD

The present invention relates to an information processing apparatus for performing an editing process on information content recorded on a recording medium, to an information processing method, and to a computer program. For example, the present invention relates to an information processing apparatus for editing content, such as an AV stream, which is captured using a video camera and stored on a recording medium, to an information processing method, and to a computer program.

More particularly, the present invention relates to an information processing apparatus for performing an editing process on content, such as an AV stream, which is stored on a recording medium, in such a manner as not to conflict with a play-only standard format, to an information processing method, and to a computer program. In particular, the present invention relates to an information processing apparatus for maintaining the compatibility with a play-only device and for performing editing to delete content on a recording medium in accordance with the format of a stream, to an information processing method, and to a computer program.

BACKGROUND ART

Disc-type recording media to which optical reading is applied (hereinafter referred to as "optical discs"), such as DVDs (Digital Versatile Disks) and CDs (Compact Discs), have rapidly become popular for applications of storing computer files and movie streams. Optical discs have a large storage capacity and random accessibility. Unlike contact-type magnetic recording media, there are no concerns regarding wear and damage on a recording surface as a result of reading, head crash, or the like. Furthermore, the disc surface is sturdy, and the risk of data being accidentally deleted is low. In recent years, optical discs have also been widely used as external recording media and external storage devices for computers.

Since disc-type recording media are randomly accessible, when an AV stream is recorded, it is possible to efficiently find a favorite scene. Furthermore, since access to data is performed in a non-contact manner, media can be used without causing them to be deteriorated.

Furthermore, in recent years, as the recording capacity of disc-type recording media has increased, video cameras of the type that store movies on a disc in place of previously used recording tape have appeared (for example, refer to Patent Document 1). For example, the number of users of DVD video cameras has increased year by year from the year 2000 and such cameras were sold due to the virtues of high image quality and high ease of use, such as editing being possible.

When the convenience of a user is considered, it is desirable in recording applications that a movie stream captured using a video camera or the like is formed as individual parts for each recording section or for each playback section so that editing, such as deletion of some parts, can be performed. On the other hand, there has been a demand that a recording medium on which recording and editing operations have been performed may be taken out as desired from a recorder, loaded into a play-only device in a house and played, and the user wants to view the captured movie on a TV monitor.

Accordingly, as a standard that is mainly targeted at applications for video cameras, in AVCHD (Advanced Video Coding High Definition), recording compatibility and additional recording compatibility functions are added to establish a specification regarding a data format for a high-definition (HD) video camera.

At this point, "deletion editing" for deleting a portion of a section of a stream recorded on a medium may be one of the following two types: nondestructive editing for deleting references from a playlist so that titles are only not seen by the user and the stream data remains on the medium; and destructive editing for actually deleting stream data recorded on a medium so as to restore the recording capacity. In the latter destructive editing, there are problems regarding a stream format. This point will be described below.

As a stream file format of AVCHD, an MPEG (Moving Picture Experts Group)-2 system has already been decided upon. According to the MPEG system specification, in order to achieve synchronization between audio and movie packets, several pieces of time stamp information are used.

In the MPEG2 system, there are two types of streams: PS (program stream) streams and TS (transport stream) streams. In AVCHD, a packet structure in which 4-byte TP_extra_header( ) is attached is used. A TS stream is formed in such a manner that video and audio data is divided into TS packets of a fixed byte length. When a stream is to be reproduced, it is input temporarily to a buffer and then decoded. As a consequence, unless the time intervals are adjusted with consideration of the status of the buffer, an overflow or an underflow is caused to occur in the buffer of a receiver, thereby obstructing the seamless nature of stream playback. For this reason, when stream data is recorded on a recording medium or is reproduced from a recording medium, suitable information on the arrival time of data for data reproduction is necessary. Therefore, a time stamp (ATS) regarding a data arrival time is inserted into all packet data transmitted in a TS format, and packet data is reproduced on the basis of the information on an arrival time.

When a stream is to be recorded, packet data received at a specific time interval is recorded on a recording medium. On the other hand, in order to reproduce recorded packet data, a counter with which packet data is transmitted to a decoder of a playback apparatus at the same time interval as the above specific time interval is necessary. Such a counter is called an arrival time clock (ATC) counter, and the counter value thereof is inserted into the packet data. When the recorded packet data is to be reproduced, the time interval at which packet data should be transmitted to a buffer of the decoder is determined on the basis of the counter value contained in the packet data. On the basis of the counter value generated by the ATC counter, an ATS is attached to packet data, and the packet data is output on the basis of the ATS when data is to be reproduced. In the AVCHD standard, it is stipulated that a single ATC is provided in one stream file, and the ATS is continuously increased monotonically.

The description returns to the editing of deleting a stream. When a section in which deletion editing is to be performed by destructive editing is an intermediate portion of a stream, the ATS possessed by the packet data at the end of the first half of the remaining stream and the ATS possessed by the packet data at the beginning of the second half thereof are non-continuous. Therefore, it becomes not possible to maintain having only a single ATC in the stream file.

[Patent Document 1]

Japanese Unexamined Patent Application Publication No. 2004-120364

DISCLOSURE OF INVENTION

Problems to be Solved by the Invention

An object of the present invention is to provide a superior information processing apparatus that is capable of suitably editing content, such as an AV stream, which is captured using, for example, a video camera and is recorded on a recording medium, a superior information processing method, and a superior computer program.

Another object of the present invention is to provide a superior information processing apparatus that is capable of performing a process of editing content, such as an AV stream stored on a recording medium, in such a manner as not to conflict with a play-only standard format, a superior information processing method, and a superior computer program.

Another object of the present invention is to provide a superior information processing apparatus that is capable of maintaining the compatibility with a play-only device and for performing editing to delete content on a recording medium in accordance with the format of a stream, a superior information processing method, and a superior computer program.

Means for Solving the Problems

The present invention has been made in view of the above-described problems. According to a first aspect of the present invention, there is provided an information processing apparatus for performing editing control of one or more AV streams recorded on a recording medium, the information processing apparatus including:

editing control means for editing an attribute definition file for defining attributes of an AV stream, the attribute definition file existing in a pair with each AV stream file recorded on the recording medium, and a playlist formed of a plurality of pieces of playback section data that specify a playback section of the AV stream at the play start point and at the play end point; and deletion editing means for performing a deletion editing process on playback section data of a relevant deletion section in response to a deletion editing instruction from a user, wherein each piece of playback section data has a connection condition with the immediately preceding playback section data, and the editing control means determines whether or not the connection condition of the playback section data to be deleted by the deletion editing means is a condition in which seamless play is possible, and corrects the content of an attribute definition file corresponding to the playback section data positioned immediately before in response to the determination result.

An AV stream to be edited in the information processing apparatus according to the present invention is, for example, movie data captured using a video camera, and is recorded as a collection of data, which is a unit necessitating playback for which continuous synchronized playback, namely, real-time playback, is guaranteed, that is, as a clip. A clip is formed by a pair of a (clip) AV stream (ClipAV stream), which is the main body of movie data, and a clip information file (ClipInformation) as an attribute definition file for defining various kinds of attribute regarding a (clip) AV stream. Playback section data for specifying a playback section of an AV stream using a play start point and a play end point is called a play item (PlayItem). A plurality of play items are arranged along the time axis, becoming a playlist (PlayList) that specifies the play order in each playback section. The playlist becomes titles that are viewed by a user.

In the playlist, one or more marks that serve as entry positions for the user are placed along the time axis along which the above-mentioned playback section data is arranged. A section between adjacent marks and the section from the final mark up to the end of the final playback section data each form a chapter. Deletion and other editing instructions from the user are performed in units of chapters. The playlist includes two types of lists: a real playlist for original titles, which is formed in such a manner that corresponding sections of an attribute definition file are sequentially registered in the playback section data in accordance with the order in which a stream is recorded on a recording medium; and a virtual playlist to which a section of an attribute definition file registered in one of the real playlists is referred to only. The virtual playlist is a user-defined playlist formed of one or more pieces of playback section data generated by nondestructive editing.

When the user instructs the deletion of a real playlist, the stream deletion editing means deletes deletion sections of a relevant stream file and a relevant attribute definition file, and then the deletion editing means deletes the playback section data of a deletion section in the playlist. On the other hand, when the user instructs the deletion of a virtual playlist, the deletion editing means deletes only the playback section data in the deletion section of the playlist.

More specifically, the present invention relates to an information processing apparatus for performing deletion editing while obeying the AVCHD format with regard to an AV stream recorded on a recording medium in accordance with the AVCHD standard.

As a stream file format of AVCHD, an MPEG-2 system has already been decided upon. When a section of a portion of a stream on a recording medium is edited to be deleted by destructive editing, it is necessary to avoid inconsistencies in time stamp information contained in an MPEG-TS stream.

In comparison, in the information processing apparatus according to the present invention, a process is performed for achieving consistency in an attribute definition file corresponding to a stream that is left after deletion is performed, including the time stamp information. More specifically, when an intermediate portion of a stream file is to be deleted, the original AV stream file is divided into two files in the deletion section. In both the divided stream files, the ATS is continuous, and only a single ATC is provided for each file. Therefore, it is possible to achieve consistency in an attribute definition file regarding the time stamp information of the stream that is left after deletion is performed.

The attribute definition file contains EP_map in which information on each entry point (EP) that is random-accessible in a corresponding stream file is arranged. The deletion editing means achieves consistency in the attribute definition file by correcting the offset from the beginning by an amount corresponding to the deletion section in EP_map in a portion after the deletion section.

In the attribute definition file, since information on an STC (system time clock) of a stream corresponding to each EP section is managed as an STC sequence, the deletion editing means corrects the STC sequence in the attribute definition file corresponding to the deletion section and subsequent sections of the stream file. More specifically, if the deletion position is not an STC sequence boundary, the deletion editing means divides the attribute definition file, deletes the STC sequence at and preceding the deletion position, and corrects the offset from the beginning within the STC sequence at and subsequent to the deletion position by an amount corresponding to the length of the deletion section.

When the real playlist is to be edited to be deleted by destructive editing, the deletion editing means performs a deletion editing process on the relevant sections of the stream file and the attribute definition file and thereafter performs the deletion editing of the playlist.

At this point, when the destructive editing of the stream file is performed, an influence is exerted on the virtual playlist that refers to the same section. For this reason, the deletion editing means also performs the deletion editing on the virtual playlist that refers to the same section.

When the mark position of a chapter indicated as a deletion section by the user does not match the boundary of the playback section data, the deletion editing means divides the playback section data containing the deletion section at the mark position and then performs the deletion editing of the playback section data contained in the deletion section.

The playback section data has information such that the connection condition with the immediately preceding playback section data indicates whether or not seamless play is possible, and the attribute definition file has information such that the connection condition with the immediately subsequent clip indicates whether or not seamless play is possible. When the playback section data of an intermediate portion along the time axis in the playlist formed of 3 or more pieces of playback section data is to be deleted, the editing control means needs to achieve matching with regard to the setting of seamless play by releasing the setting of seamless play with the immediately preceding in the beginning playback section data on the backward side, which is left after deletion is performed, and also by releasing the setting of seamless play with the immediately subsequent clip in the final attribute definition file on the forward side, which is left after deletion is performed.

As a result of deleting the playback section data, when the mark is lost at the beginning of the playlist, the deletion editing means needs to attach a mark to the beginning of the playback section data, which becomes a beginning after deletion is performed.

The playback section data in the playlist has sequence numbers that are consecutively provided along the time axis, and each mark holds the sequence number of the playback section data to which the mark belongs as reference information. Therefore, the editing control means needs to correct the reference information to the sequence number of the mark at which the chapter that is a deletion section is deleted on the basis of the number of pieces of the deleted playback section data and subsequent thereto.

According to a second aspect of the present invention, there is provided a computer program written in a computer-readable format so as to enable a computer to execute processing for performing editing control of one or more AV streams recorded on a recording medium, the processing including:

an editing control step of editing an attribute definition file for defining attributes of an AV stream, the attribute definition file existing in a pair with each AV stream file recorded on the recording medium, and a playlist formed of a plurality of pieces of playback section data that specify a playback section of the AV stream at the play start point and at the play end point; and a deletion editing step of performing a deletion editing process on playback section data of a relevant deletion section in response to a deletion editing instruction from a user, wherein each piece of playback section data has a connection condition with the immediately preceding playback section data, and in the editing control step, it is checked whether or not the connection condition of the playback section data to be deleted in the deletion editing step is a condition in which seamless play is possible, and the content of an attribute definition file corresponding to the playback section data positioned immediately before is corrected in response to the determination result.

The computer program according to the second aspect of the present invention is such that a computer program described in a computer-readable format so as to implement predetermined processing in a computer is defined. In other words, as a result of installing a computer program according to the second aspect of the present invention into a computer, coordinated operation is exhibited in the computer, and the same operational advantages as those of the information processing apparatus according to the first aspect of the present invention can be obtained.

Advantages

According to the present invention, it is possible to provide a superior information processing apparatus that is capable of performing an editing process of editing content, such as an AV stream stored on a recording medium, so as not to conflict with a play-only standard format, a superior information processing method, and a superior computer program.

According to the present invention, when deletion by destructive editing in which the recording capacity of a recording medium should be restored is to be performed, even in the case that an intermediate portion of a particular AV stream is a section to be deleted, an editing process can be realized while obeying the constraints of a ROM standard format such that only a single ATC is provided in an AV stream file.

Other objects, features, and advantages of the present invention will become apparent from the more detailed description based on the embodiments of the present invention as will be described later and the attached drawings.

BRIEF DESCRIPTION OF THE DRAWINGS

FIG. 15 illustrates the fact that the correction of EP_map is unnecessary when the backward side of a clip AV stream file is deleted.

FIG. 16 shows a state in which, when the forward side of a clip AV stream file is deleted, an offset of EP_map is corrected in the remaining sections on the backward side.

REFERENCE NUMERALS

Figure 1:
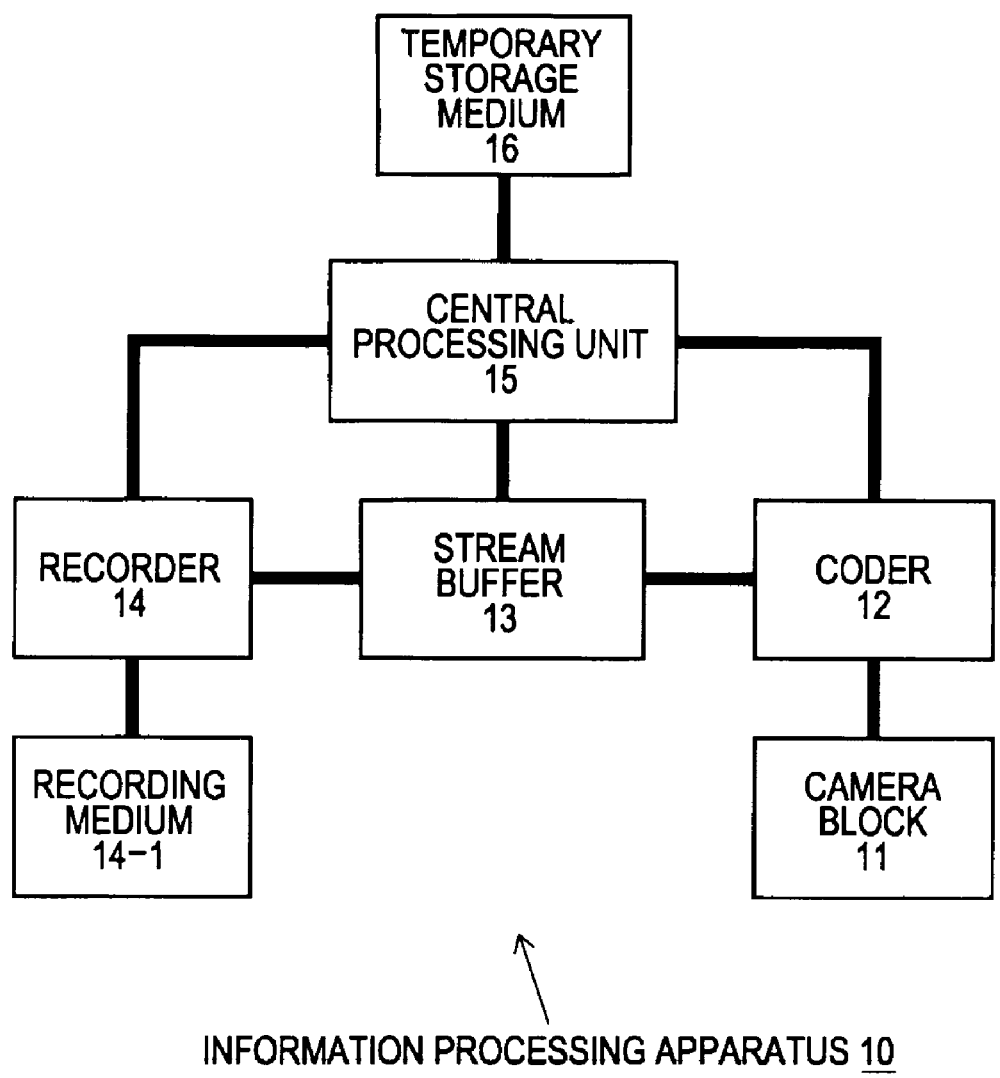
FIG. 1 schematically shows the function configuration of an information processing apparatus 10 according to an embodiment of the present invention.

10 . . . information processing apparatus
11 . . . camera block
12 . . . coder
13 . . . stream buffer
14 . . . recorder
14-1 . . . recording medium
15 . . . central processing unit
16 . . . temporary storage medium

BEST MODE FOR CARRYING OUT THE INVENTION

An embodiment of the present invention will be described in detail below with reference to the drawings.

A. System Configuration

FIG. 1 schematically shows the function configuration of an information processing apparatus 10 according to an embodiment of the present invention.

The information processing apparatus 10 shown in the figure is configured as a video camera, and a movie stream captured using a camera block 11 is coded using a video codec in a coder 12 and thereafter is multiplexed into an MPEG-TS stream, and this stream is recorded on a recording medium 14-1 loaded into a recorder 14. However, the information processing apparatus 10 is not necessarily a video camera, and may be an information processing apparatus for receiving a movie stream via a LAN and other transmission media. Furthermore, when a TS stream coded using an appropriate codec is to be received, the construction is formed in such a way that the coder 12 is omitted and instead, a stream receiver (not shown) is provided. The recording medium 14-1 is not limited to a DVD, and the type of medium does not particularly matter as long as the medium has a recording capacity enough to store a stream file.

A central processing unit 15 centrally controls the processing operation of the entire information processing apparatus 10 in such a way that the central processing unit 15 loads an execution program into a temporary storage medium 16 formed by a RAM (Random Access Memory), and the central processing unit 15 executes the program while system variables and environment variables are temporarily stored. Examples of processing operation referred to herein include movie capturing by the camera block 11, an auto-focus function, automatic exposure, camera shake correction, and auto shutter, which are involved with movie capturing, compression and multiplexing processes by the coder 12, recording of a movie stream on the recording medium 14-1 by the recorder 14, and a process for editing streams recorded on the recording medium 14-1.

The process for editing a stream referred to herein refers to editing, such as deletion of a portion of a section of a stream on a recording medium, movement and rearrangement of streams after the streams are formed as parts. The editing process includes destructive editing in which a stream on a recording medium is processed, and nondestructive editing in which only reference information on a playback section of a stream is edited. In a specific embodiment of the present invention, a process for recording and editing a stream on the recording medium 14-1 is performed in a format in compliance with the AVCHD standard, that is, in a format compatible with an AVCHD play-only device. The details of these points will be described later.

The coder 12 codes a movie stream in accordance with an AVC method, multiplexes it with the MPEG2 system format, and outputs a TS stream formed of TS packets of a fixed byte length (or receives TS packets from an external apparatus via a transmission medium such as a LAN). The TS packets are temporarily stored in a stream buffer 13, and the recorder 14 records them on the recording medium 14-1. The time intervals at which the recorder 14 receives TS packets from the coder 12 have various values.

When the recorded stream is to be reproduced, the TS packets read from the medium are temporarily input to a buffer (not shown) and thereafter are decoded. At this time, it is necessary to transmit packet data to the receiving side while the time intervals are adjusted with consideration of the status of the buffer so that the decoder buffer of the playback apparatus does not cause an overflow or an underflow to occur. Therefore, information on the arrival time of each piece of packet data to be transmitted to the recorder, that is, an ATS, is inserted into all the packets (well known), and the packet data is reproduced on the basis of the information on the arrival time.

When the recorder 14 receives TS packet data via the stream buffer 13 at a specific time interval, the recorder 14 records it on the recording medium 14-1. In order to reproduce recorded TS packets, an arrival time clock (ATC) counter with which packet data is transmitted to the decoder on the playback apparatus side at the same time interval as the above-mentioned specific time interval is necessary. For this reason, when a TS stream is to be recorded on the recording medium 14-1, an ATS is attached to each TS packet on the basis of the counter value generated by the ATC counter. When data is to be reproduced, TS packets are sequentially output on the basis of the ATS.

B. Data Format

Movie data captured using a video camera is recorded as a clip on the basis of a pair of a clip AV stream and a clip information file that defines the attributes of the clip AV stream.

Figure 27:
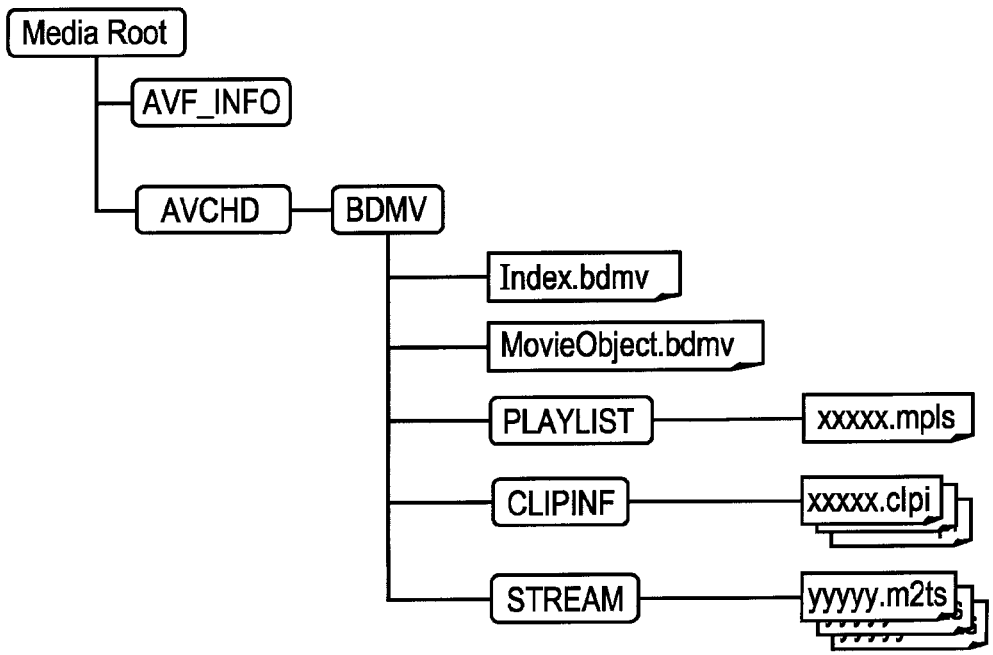
FIG. 27 shows the directory structure of a recording medium 15, which is defined by the AVCHD standard.

FIG. 27 shows the directory structure of a recording medium 15, which is defined by the AVCHD standard. "PLAYLIST", "CLIPINF", and "STREAM", which are arranged directly below the BDMV directory, are sub-directories for storing playlists, clip information files, and clip AV stream files, respectively.

For the movie data, a collection of data, which is a unit necessitating playback for which continuous synchronization playback, that is, real-time playback, is guaranteed, forms one clip (Clip), and is recorded as one movie file. The clip AV stream is a file in which movie streams are stored in an MPEG2-TS format. The clip information file exists in a pair with the clip AV stream file, and is a file in which information on a movie stream, which is necessary to reproduce a real movie stream, is described. The playlist is formed of a plurality of play items (PlayItems). Each play item specifies a play start point (IN point) and a play end point (OUT point) with respect to a clip, and the playback section and the play order of movie data are specified by the series of play items in the playlist.

Figure 2:
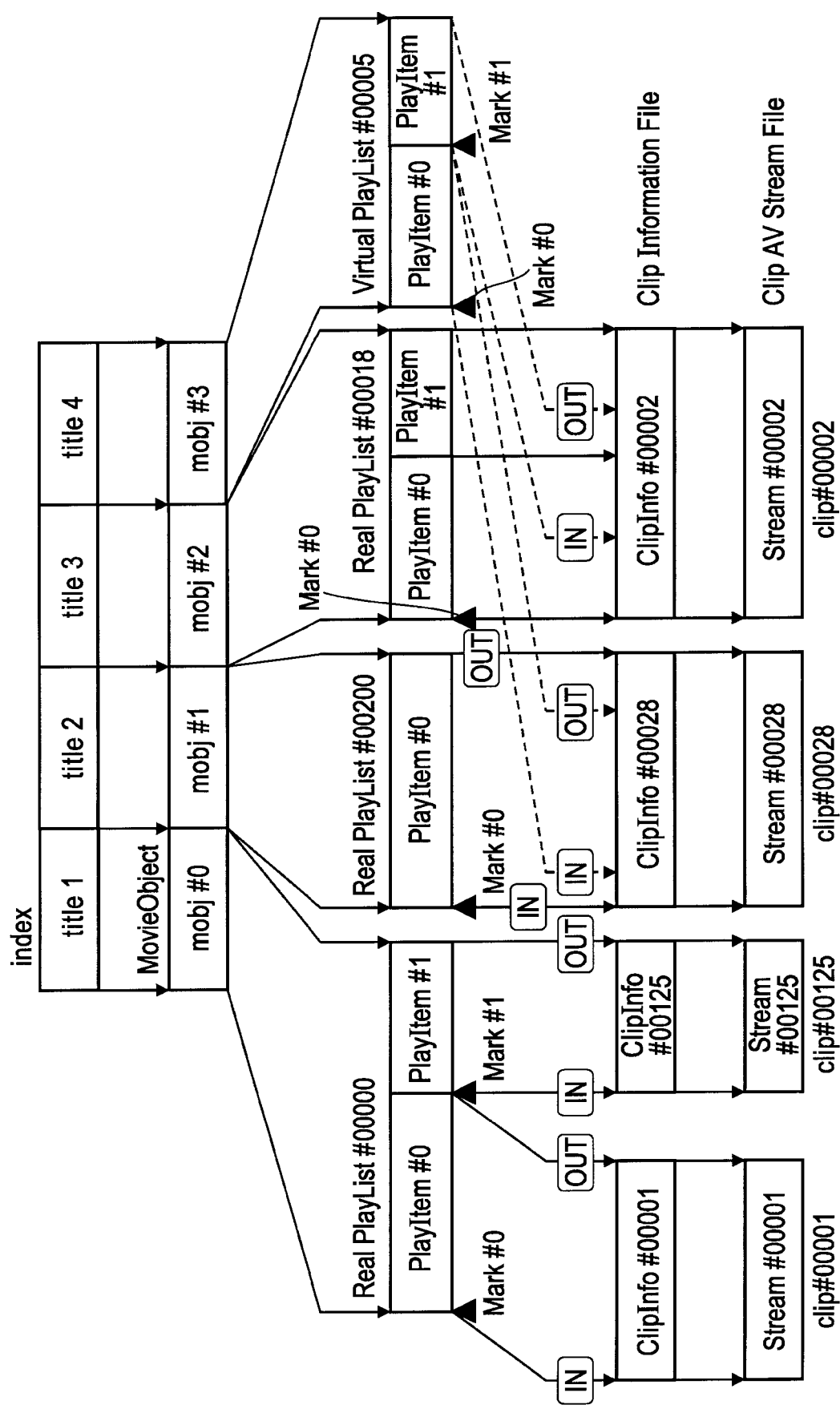
FIG. 2 shows an example of data structure with which data is recorded on a recording medium 14-1.
Figure 3A:
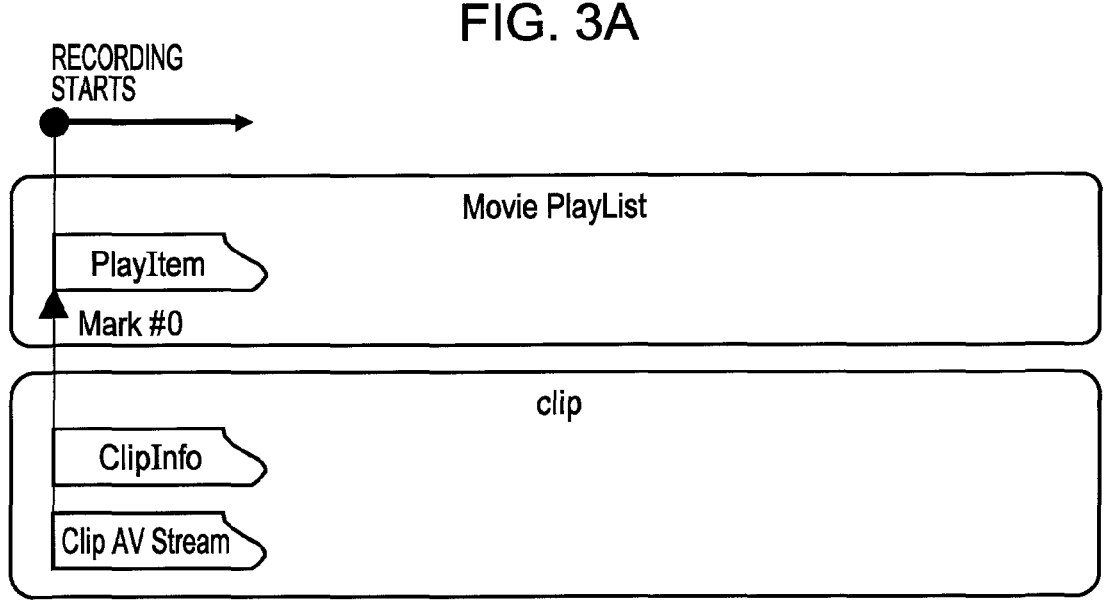
FIG. 3A illustrates a procedure in which a clip of a clip AV stream and a playlist are generated in response to video recording and capturing using a video camera.
Figure 3B:
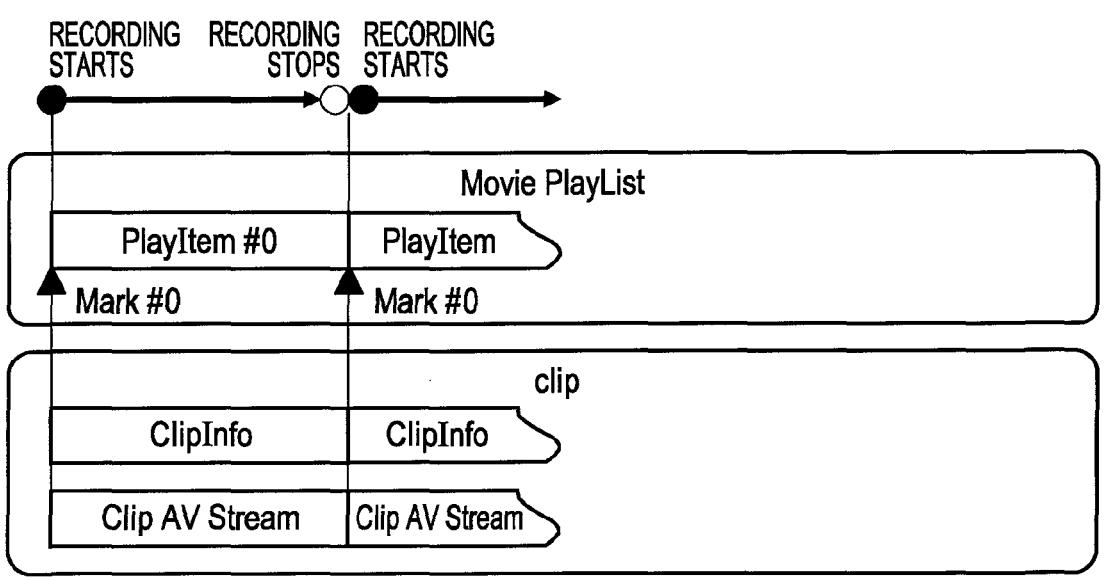
FIG. 3B illustrates a procedure in which a clip of a clip AV stream and a playlist are generated in response to video recording and capturing using a video camera.
Figure 3C:
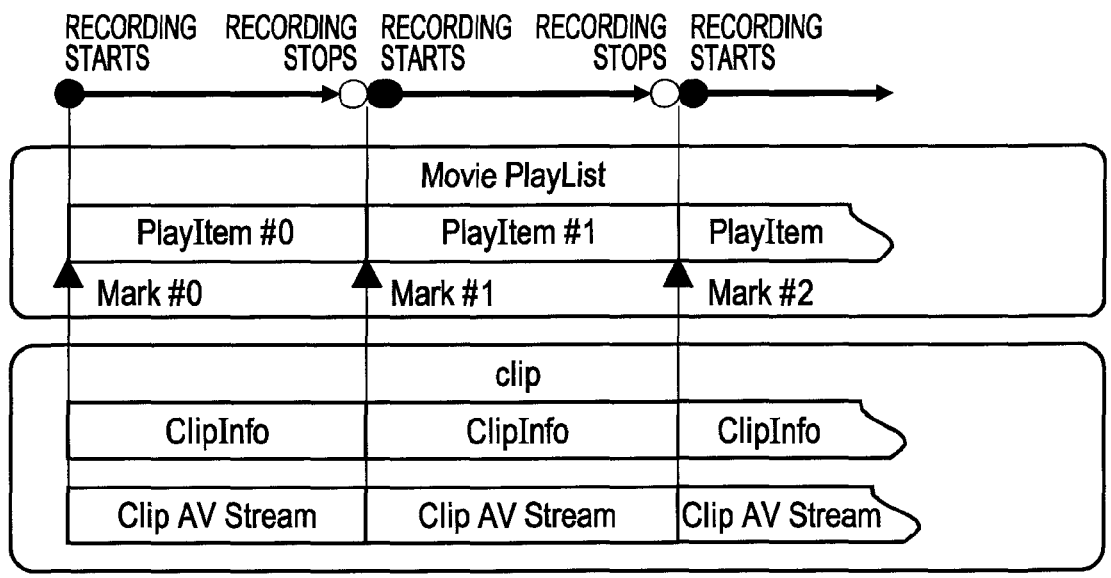
FIG. 3C illustrates a procedure in which a clip of a clip AV stream and a playlist are generated in response to video recording and capturing using a video camera.
Figure 3D:
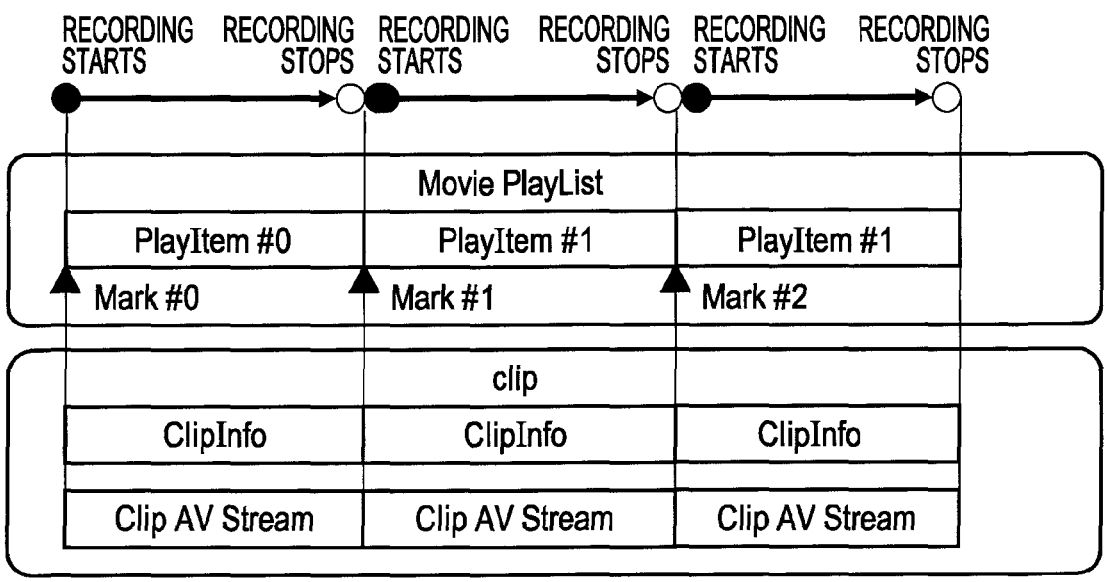
FIG. 3D illustrates a procedure in which a clip of a clip AV stream and a playlist are generated in response to video recording and capturing using a video camera.

FIG. 2 shows an example of a logical data structure in which user data is recorded on the recording medium 14-1 in accordance with the AVCHD standard format in a form in which video recording editing is possible. As shown in the figure, when movie data captured using a video camera is to be coded into an MPEG2-TS stream and recorded, files of various types of an index (index), a movie object (MovieObject), a playlist (PlayList), clip information (ClipInformation), and a clip AV stream (ClipAV stream) are used.

TABLE 1

| File Type | Maximum Number | Role |
|---|---|---|
| Index | 1 | Root file used to manage the entire medium. Manages the correspondence between titles to be viewed by a user and movie objects. In the AVCHD format, manages the order in which a playlist is reproduced, which should be originally managed by a movie object file within the metadata of the index file. |
| Movie Object | 1 | File used to manage playlist that is reproduced when a title is specified. |
| Real playlist | Total 2000 | Playlist for an original title. Video movie that is recorded/reproduced is registered in a recording order. |
| Virtual Playlist | | Playlist used to create user-defined playlist by nondestructive editing. Does not have a clip unique to a virtual playlist, and a clip registered in one of real playlists is pointed to and is reproduced. |
| Clip Information | 4000 | Exists in a pair with a clip AV stream file. Information on a stream necessary to reproduce a real stream is described. |
| Clip AV Stream | 4000 | File in which a stream recorded using MPEG2-TS is stored. Image data of AVC is stored in this file. |

The entire storage area on the recording medium 14-1 is managed by the file type layer of the index (index.BDMV). The index file is created for each title to be viewed by the user so that the correspondence with movie objects is managed. The "title (Title)" referred to herein is a collection of (user recognizable) playlists (PlayLists), and in general, is formed of one program and content for each date. In the AVCHD standard format, the order in which playlists are reproduced, which should originally be managed by the movie object file, is managed within metadata of the index file. When a recording medium is loaded into a player, first, an index is read, and the user is able to view titles described in indexes.

The movie object is a collection of commands used to control reproduction and is, for example, a file used to manage a playlist from which a title is reproduced when it is specified in the existing ROM standard format. References to the movie objects are listed in indexes as entries of titles. However, in the AVCHD standard format, the relationship between the playlists and the titles are managed using metadata of the index file without referring to the movie object file.

The playlist is provided in such a manner as to correspond to a title to be viewed by the user, and is formed of one or more play items (PlayItems). Each play item has playback section data formed of a play start point (IN point) and a play end point (OUT point) for a clip, thereby specifying the playback section of the clip AV stream. Then, as a result of arranging a plurality of play items in the playlist, it is possible to specify the order in which playback sections are reproduced. Furthermore, it is possible to contain play items that specify a playback section in different clip AV stream files in one playlist. In other words, entities corresponding to a group of play items contained in one playlist is not limited to one clip AV stream file and play items that refers to different clips can be contained in one playlist.

The relationship of reference between clips and playlists can be set freely. For example, reference to one clip can be made from two different PlayLists at the IN point and at the OUT point. Furthermore, the relationship of reference between titles and movie objects can be freely set. The playlist is broadly classified into two types of a real playlist (RealPlayList) and a virtual playlist (VirtualPlayList) on the basis of the reference relationship with clips.

The real playlist is a playlist for an original title, in which play items for a video stream recorded and captured using a video camera are arranged in the order in which they are recorded.

The virtual playlist is a playlist used to create a user-defined playlist by nondestructive editing, and does not have a clip (AV stream) unique to the virtual playlist. The play item in the playlist points to one of clips registered in the real playlist or in the range of a portion thereof. That is, it is possible for the user to extract only the necessary playback section from a plurality of clips and to edit a virtual playlist by collecting (copying) play item pointing to the section.

The clip is a file of movie data that is recorded as a collection of data, which is a unit necessitating playback for which continuous synchronization playback, that is, real-time playback, is guaranteed, and is formed of a clip AV stream file (Clip AV stream) and a clip information file (Clip Information).

The clip AV stream as content data is a file in which a stream is recorded on the recording medium 14-1 in accordance with the MPEG-TS format. Image data of the AVC is stored in this file.

The clip information file is a file that exists in a pair with the clip AV stream file and that defines attributes regarding a movie stream, which become necessary to reproduce a real movie stream. More specifically, a coding method of a movie stream, the size of a movie stream, playback time→address conversion, playback management information, and information that defines a time map (when the recording medium is a DVD) and the like, are contained in the clip information file.

Next, a description will be given, with reference to FIGS. 3A to 3D, of an example of a procedure in which a clip of a clip AV stream and a playlist are created in accordance with video recording and capturing using a video camera.

As shown in the figure, one play item is created for each section from when the user starts video recording until the recording is stopped. For example, the section from when recording is started first until the recording is stopped is registered in a movie playlist (Movie PlayList) as a play item (PlayIteM #0) having a serial number 0. Furthermore, the section from when the recording is started next until the recording is stopped is registered in a movie playlist (Movie PlayList) as a play item (PlayIteM #1) having a serial number 1 (the same applies hereinafter).

The real playlist has one-to-one correspondence with the content of an entity, that is, a clip AV stream. The individual play items registered in the real playlist hold time information on the play start point and the play end point of the corresponding playback section of each of the clip AV streams.

Furthermore, in a movie stream, including an MPEG2-TS, as a result of performing coding so that a predetermined buffer model, such as an underflow or an overflow of an internal buffer, does not fail, "seamless play" with which continuous reproduction is performed across streams is made possible. Each play item (excluding the play item at the beginning of the playlist) holds a connection condition (that is, whether or not seamless play is possible) with the immediately preceding play item.

Each time the user starts video recording, a mark as an entry mark is attached to the beginning of the play item (an entry mark in the playlist is also referred to as a "playlist mark (PLM)". One or more playlist marks exist in the playlist, each of which has a role of pointing to a specific playback position of the clip AV stream. In one playlist, a serial number that is consecutive along the time axis is attached to each playlist mark. Furthermore, each playlist mark registered in the playlist holds the serial number of the play item to which such a mark has been attached and time stamp information indicating the playback position of the clip AV stream.

Then, one clip AV stream file is formed at the division of the recorded and captured streams. One clip AV stream is a unit necessitating playback for which continuous synchronization playback, that is, real-time playback, is guaranteed. As a result of this, a clip information file used to define a coding method of a movie stream, the size of a movie stream, playback time→address conversion, playback management information, a time map (when the recording medium is a DVD), and the like is created.

There is a definition that a playlist mark is always placed at the beginning of the movie playlist (MoviePlayList). However, the position of a playlist mark can be moved along the time axis by a subsequent editing operation.

Each playlist mark becomes an entry position at which the user accesses a stream. Therefore, of division sections (and the section from the final play item mark to the end of the final playlist) divided between adjacent entry marks become a minimum editing unit that can be viewed by the user, that is, a "chapter". As a result of arranging play items in the order of playback and arranging playlist marks in the desired order of playback, the order of the playback of each section of the clip AV stream registered in the playlist is defined.

In the product specification, a plurality of real playlists are collected and presented as a group of consecutive chapters to the user. For example, on the editing screen of a video camera, thumbnails (or thumbnail movies in which a playlist mark position is used as a play start point) of still image frames at each playlist mark position, which defines a chapter, are displayed in a list, so that an editing environment in units of chapters is provided to the user.

When a particular playlist is to be reproduced, in the case that it is continuously reproduced across two clip AV streams, there is a possibility that an internal buffer possessed by the decoder overflows. Therefore, usually, after the reproduction of the preceding stream is completed, the reproduction of the next stream is performed. For this reason, the screen is momentarily frozen at the change of the streams.

In comparison, when a specific condition is satisfied, "seamless play" such that streams are continuously reproduced across the streams is possible. In order to create streams for which seamless play is possible, a coding method may be used in which, when the recording of the preceding clip AV stream is completed, the status of the buffer is reported to the coder when the recording of the next clip AV stream is started, so that a predetermined buffer model does not fail. Information used to code streams for which seamless play is possible, that is, seamless information, differs depending on the coding method and the system specification of a device. In general, examples thereof include those shown in the table below.

TABLE 2

| Information | Content |
| --- | --- |
| VIDEO INPUT BUFFER VALUE | Stored amount [byte] of STD video buffer at previous recording time |
| AUDIO INPUT BUFFER VALUE | Stored amount [byte] of STD audio buffer at previous recording time |
| VIDEO END PTS | PTS [90 kHz] of video at previous recording time |
| AUDIO END PTS | PTS [90 kHz] of audio at previous recording time |
| VIDEO END PTS | PTS [90 kHz] of video at previous recording time |
| END SCR BASE | SCR value [90 kHz] at previous recording time |
| END SCR EXT | Fraction [27 kHz] of SCR value at previous recording time |

When the title of content, that is, one playlist, is formed by a plurality of play items, a connection condition (Connection Condition (CC) flag) for the immediately preceding play item, that is, whether or not clip AV streams can be seamlessly (continuously) reproduced, is described in the play item. In the clip information file, the file name of the succeeding clip information file and the connection condition are described. The connection condition for the succeeding clip information file is indicated by the value described in the connection condition field. When the connection condition=1, the play items are non-continuous and when the connection condition=5 or 6, the play items are continuous (for the clip information file, only in the case of 5, the connection condition is described).

C. Editing of Deleting Content on Recording Medium

When applications for video cameras are considered regarding a disc-type recording medium, it is preferable in recording applications that editing, such as deletion of content captured using a recorder such as a video camera, can be performed. On the other hand, when it is considered that a recording medium is removed as desired from a video camera and a movie is reproduced using an AVCHD play-only device, it is preferable that the editing result does not conflict with the play-only format, more specifically, the data structure edited using a video camera of the AVCHD specification obeys the AVCHD standard.

In the following, in particular, by considering the case of performing deletion editing, a process for editing data on a recording medium while obeying the AVCHD standard will be described in detail.

C-1. Editing of Deleting Playlist

Figure 4:
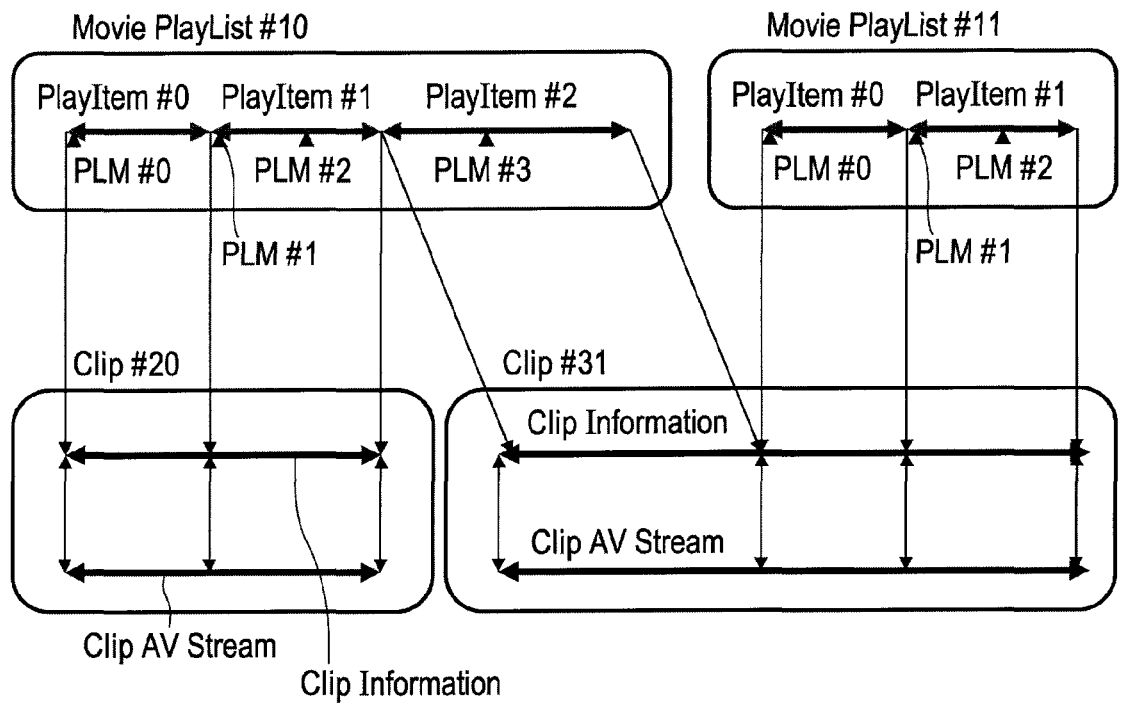
FIG. 4 shows an example of the structure of files recorded on a recording medium.

At first, a case is assumed in which recording has been performed on a recording medium in the file structure shown in FIG. 4. In the example shown in the figure, on the recording medium, as titles, a movie playlist #10 and a movie playlist #11 are stored on the recording medium.

The movie playlist #10 is formed of play items #0 to #2. Regarding the play items #0 and #1, a clip AV stream stored as a clip #20 is an entity, and regarding the play item #2, a section of a portion from the beginning of a clip AV stream stored as a clip #31 is an entity. Playlist marks (PLM) #0 to #3 indicated by Δ in the figure are entry positions of each chapter, and sections between adjacent playlist marks and the section from the final playlist mark to the end of the final play item are the chapters of the movie playlist #10.

On the other hand, the movie playlist #11 is formed of play items #0 and #1, and the section used in the movie playlist #10 and subsequent sections among the clip AV streams stored as a clip #31 are entities of the respective play items. Playlist marks (PLM) #0 to #2 indicated by Δ in the figure are entry positions for each chapter, and sections between adjacent playlist marks and the section from the final playlist mark to the end of the final play item are chapters of the movie playlist #11.

Regarding the deletion of a play item from the playlist, the processing method differs depending on which one of a virtual playlist and a real playlist the playlist is. The deletion of a play item in the virtual playlist is nondestructive editing confined to the deletion of a file of play items, and the clip information file and the clip AV stream, which are pointed to by the play item, are kept to be stored on the disc. In contrast, the deletion of a play item in the real playlist is such that the entity of the corresponding section of the clip AV stream is deleted (destructive editing) to restore the recording capacity.

FIG. 5 shows a state in which a play item is deleted from a virtual playlist. However, the editing unit by the user is not a play item but a chapter. In FIG. 5, for the sake of convenience, an example is shown in which both ends of the play item match the playlist mark position.

Figure 5A:
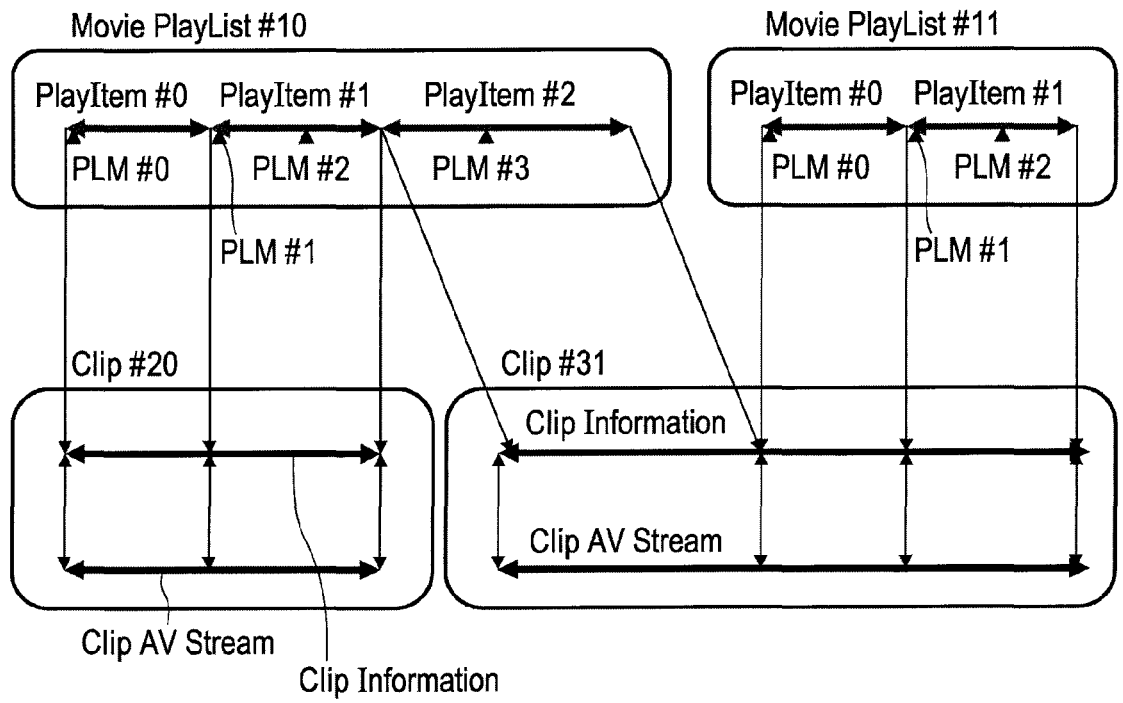
FIG. 5A shows a state in which play items are deleted from a virtual playlist.
Figure 5B:
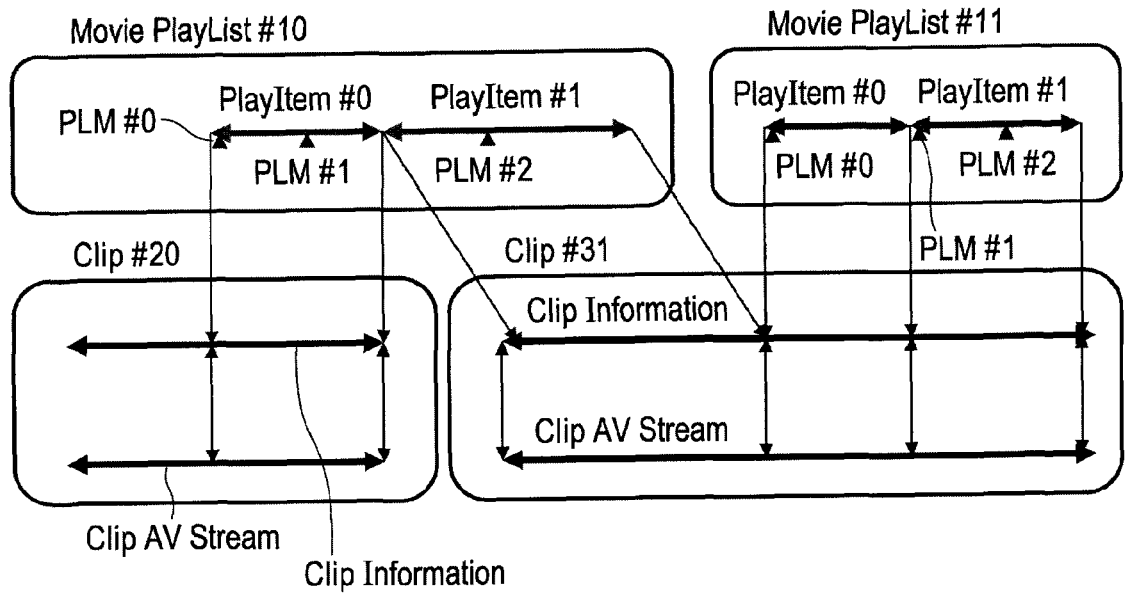
FIG. 5B shows a state in which play items are deleted from a virtual playlist.

In the file structure (the same as in FIG. 4) shown in FIG. 5A, the play item #0 corresponding to the beginning of the movie playlist #10 is deleted. The movie playlist #10 is a virtual playlist formed of a playlist created by user definition using nondestructive editing. The play items contained in the playlist point to a plurality of clip AV streams, that is, a clip #20 and a clip #31. Therefore, each play item does not have entities of the clip #20 and the clip #31. The deletion of the play item #0 is confined to the deletion of the play item #0, and the deletion (destructive editing) of the entity of the clip AV stream, which is related to the deletion of the play item #0, is not performed (see FIG. 5B).

Figure 6A:
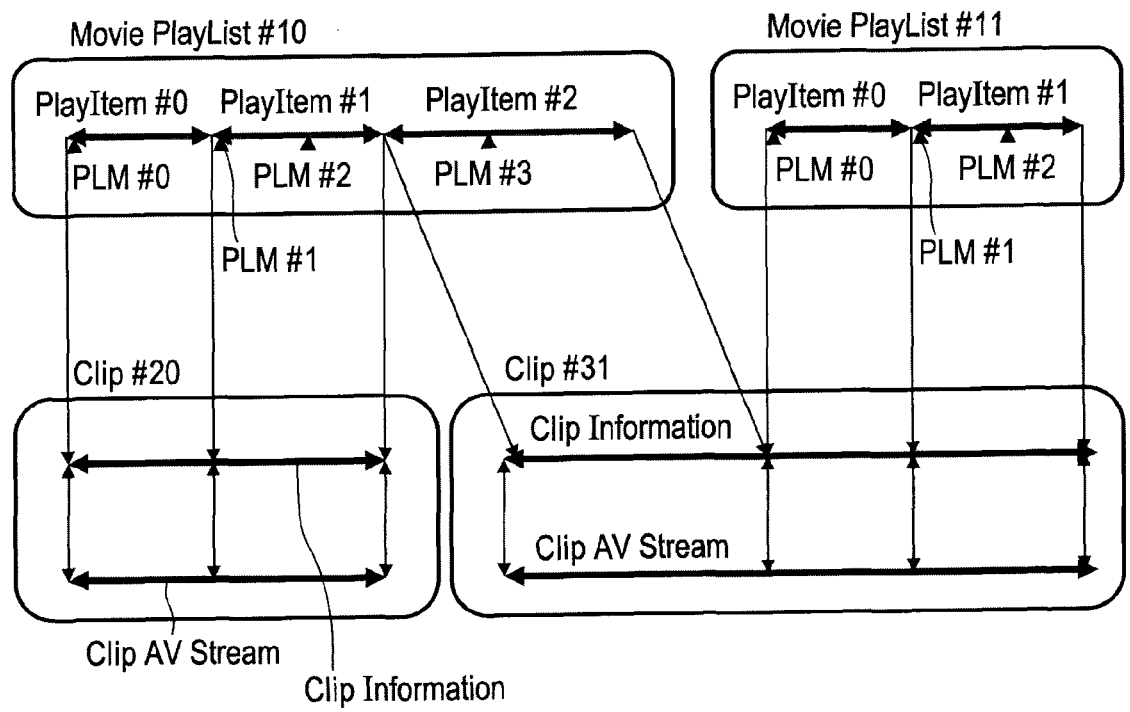
FIG. 6A shows a state in which play items are deleted from a real playlist.
Figure 6B:
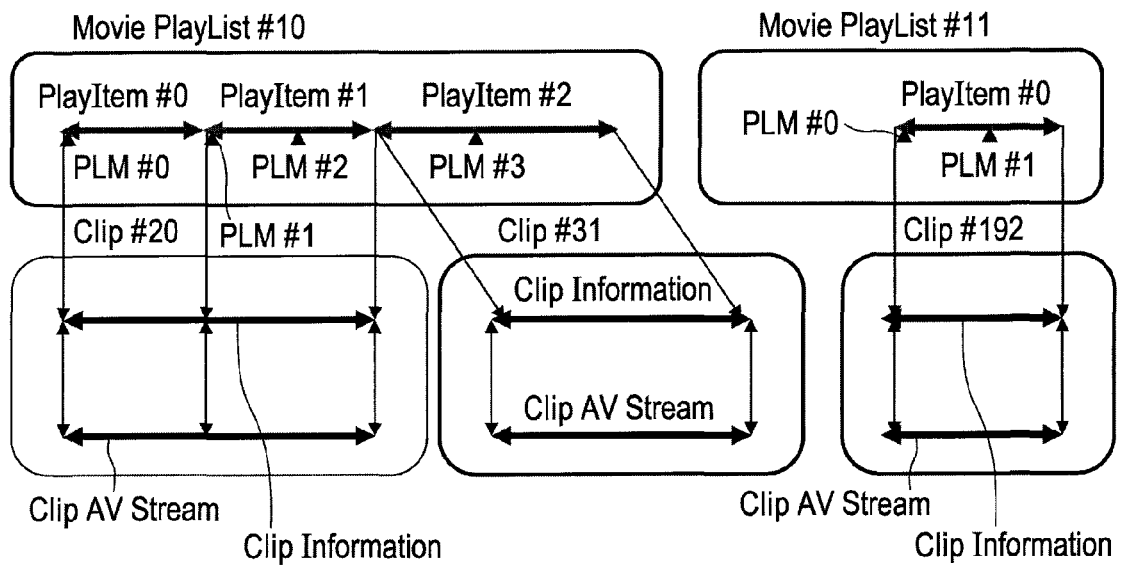
FIG. 6B shows a state in which play items are deleted from a real playlist.

FIG. 6 shows a state in which a play item is deleted from a real playlist. That is, a state is shown in which, in the file structure (the same as in FIG. 4) shown in FIG. 6A, the play item #0 corresponding to the beginning of the movie playlist #11 is deleted. However, the editing unit by the user is not a play item but a chapter. In FIG. 6, for the sake of convenience, an example is shown in which both ends of the play item match the playlist mark position.

The movie playlist #11 is a real playlist and has a single clip AV stream, that is, a clip #31. Therefore, for deleting the play item #0, the play item #0 is deleted and also, the entity of the corresponding section of the clip AV stream is deleted (destructive editing), thereby restoring the recording capacity (see FIG. 6B).

When a file is divided before and after the deleted section when an intermediate portion of the clip AV stream file is deleted, the clip information file that forms a pair therewith is also divided. Therefore, the deletion of the intermediate portion of the clip AV stream file causes the number of clip information files to be increased. In the example shown in FIG. 6B, after the intermediate portion of the original clip #31 is deleted, the clip #31 becomes a clip AV stream file of only the portion before the section, and a new clip #192 is formed in and subsequent to the section in which deletion editing has been performed. The reason why a file is divided on the forward side and on the backward side of the deletion section is to achieve consistency in time stamp information possessed by the clip AV stream. The details of this point will be described later.

With reference to FIG. 6, for the sake of convenience, a description has been given using an example in which both ends of the play item match the playlist mark position. However, when the entry mark position of a chapter indicated as a deletion section by the user does not match the boundary of the play item, the play item containing a deletion section is divided at the entry mark position and then the play item (and the corresponding section of the clip) contained in the deletion section is deleted. For this reason, the deletion editing of the play item causes the number of play items to be increased in the middle of processing.

Figure 7A:
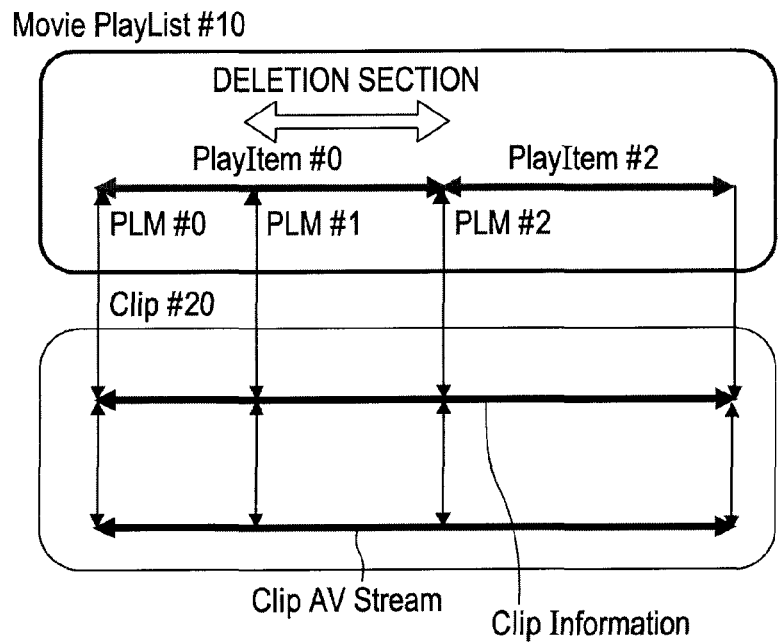
FIG. 7A shows a state in which editing of deleting an intermediate play item in a play item loop is performed when an entry mark position of a chapter indicated as a deletion section by a user does not match the boundary of a play item.
Figure 7B:
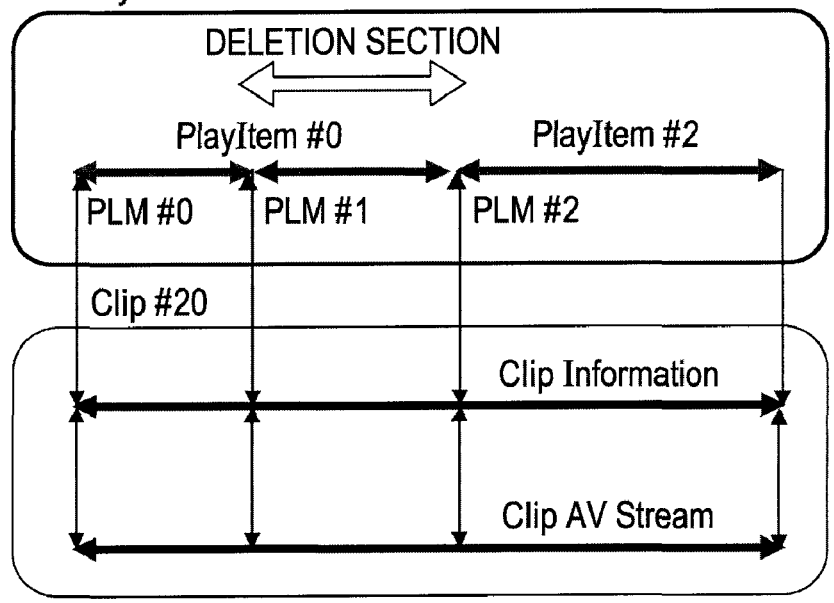
FIG. 7B shows a state in which editing of deleting an intermediate play item in a play item loop is performed when an entry mark position of a chapter indicated as a deletion section by a user does not match the boundary of a play item.
Figure 7C:
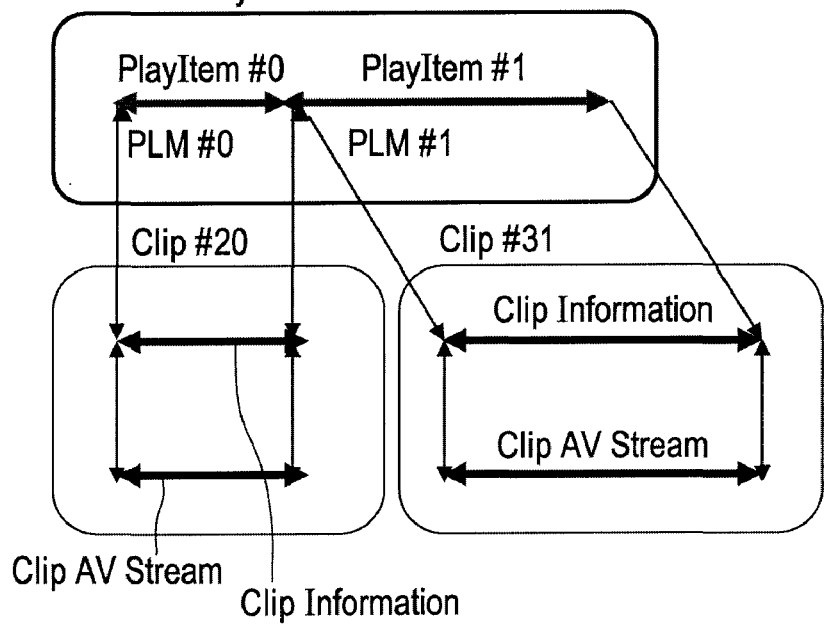
FIG. 7C shows a state in which editing of deleting an intermediate play item in a play item loop is performed when an entry mark position of a chapter indicated as a deletion section by a user does not match the boundary of a play item.

In the example shown in FIG. 7, the movie playlist #10 is formed of a play item #1 and a play item #2. Playlist marks PLM #0 and PLM #1 are placed at the beginning and at an intermediate position in the play item #0 and also, a PLM #2 is placed at the beginning of the play item #2. As an entity of the clip AV stream, the play item has a clip #20. At this point, as shown in FIG. 7A, a chapter divided by the PLM #1 and the PLM #2 is assumed to be specified as a deletion section. In such a case, as shown in FIG. 7B, the play item #0 is temporarily divided into two portions at the position of the PLM #1. Then, as shown in FIG. 7C, the play item that is in the deletion section is deleted, and as a result, the playlist mark that has become unnecessary is also deleted. Furthermore, since an intermediate portion of the clip AV stream file is also set as a deletion section, the clip is also divided into two portions on the forward side and on the backward side of the deletion section, and a new clip #31 is created.

In the example shown in FIG. 6, the play item at the beginning of the playlist is deleted. In the playlist formed of 3 or more play items, when one or more play items in an intermediate portion of a play item loop is to be deleted, the end of the play item in the first half, which is left after deletion is performed, is connected with the beginning of the play item in the second half.

The fact that the connection condition can be set to seamless play according to the buffer status between adjacent play items has already been described. When the preceding or succeeding play item and the play item for which seamless play has been set are deleted, it is clear that the buffer status is not ready between the play items that are connected after deletion is performed, and it is necessary to release the setting of the seamless play.

Figure 8A:
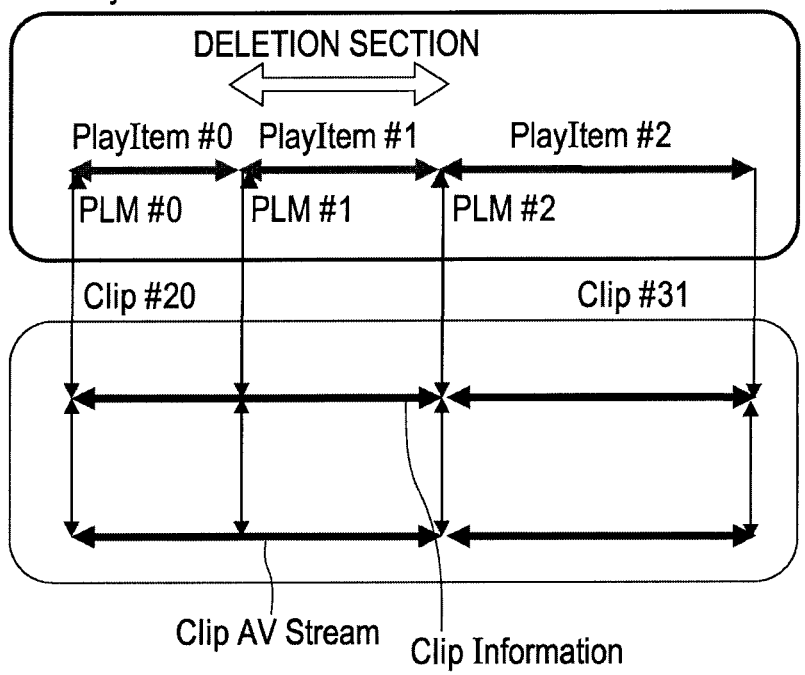
FIG. 8A illustrates a play item immediately before the play item is deleted when the play item is deleted and a procedure for operating the setting of a connection condition for the play item.
Figure 8B:
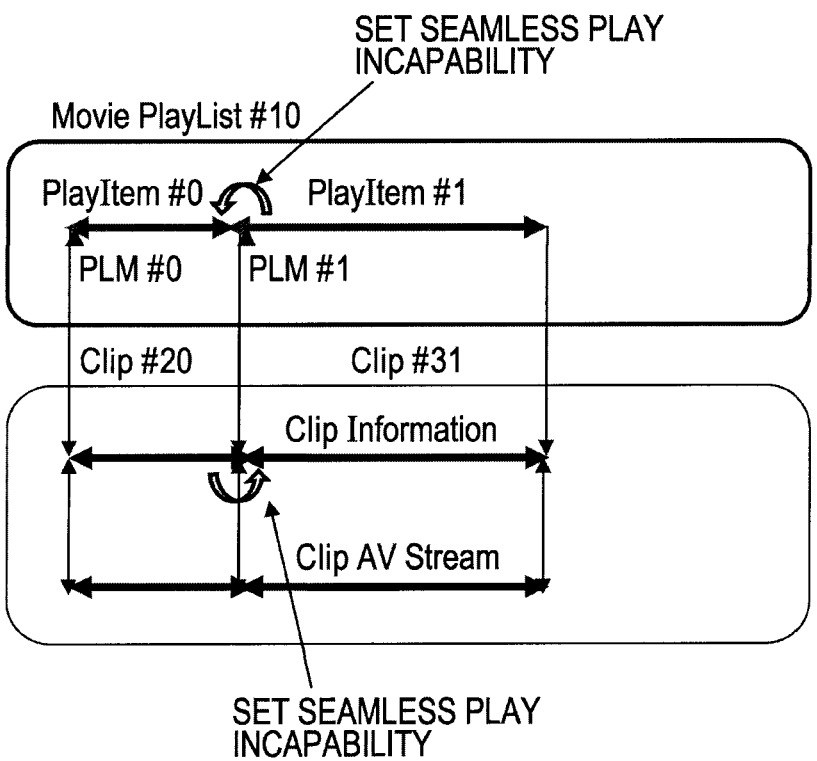
FIG. 8B illustrates a play item immediately before the play item is deleted when the play item is deleted and a procedure for operating the setting of a connection condition for the play item.

More specifically, when the connection condition (CC) for the immediately preceding play item in the play item on the backward side has been set to seamless play, this is released. When the connection condition for the clip on the backward side is set to seamless play in the clip information corresponding to the play item on the forward side, this is released. In the example shown in FIG. 8A, the play item #1 in the movie playlist #10 is a deletion section. When the play item and the sections of the clip AV stream and the clip information corresponding to the play item are to be deleted, as shown in FIG. 8B, the play item #2 is newly replaced with the play item #1, and the connection condition in the play item and the clip information is reset so as not to be seamless play.

Figure 9:
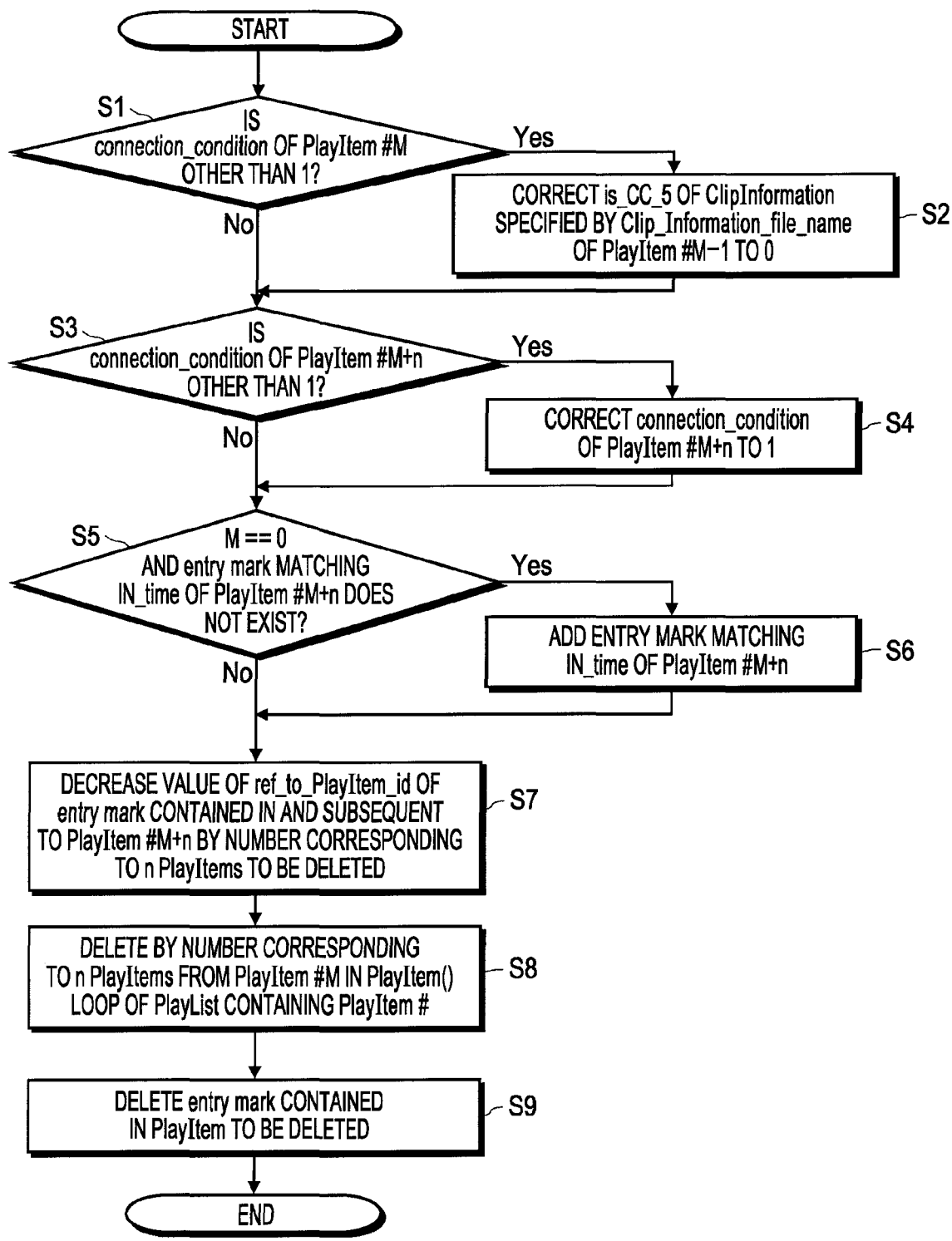
FIG. 9 is a flowchart showing a processing procedure for performing editing of deleting n play items from the M-th play item in a playlist.

FIG. 9 shows, in a flowchart, a processing procedure for performing deletion editing of n play items from the M-th play item (i.e., the play items #M to #M+n) in a certain playlist.

At first, the connection condition (connect_condition) with a play item #M−1 immediately preceding the play item #M at the beginning of a section to be deleted, the connection condition being set in the play item #M, is confirmed (step S1). When it has not been set that connect_condition=1, that is, when seamless play has been set, the process proceeds to step S2, where seamless play that is set as a connection condition of a succeeding clip is released in the clip information file corresponding to the play item #M−1. For example, with regard to the AVCHD format, an is_CC_5 flag in the play item data structure is released.

Next, the connection condition (connect_condition) with the immediately preceding play item #M+n−1 (that is, at the end of the section to be deleted), which is set in the play item #M+n that succeeds the end of the section to be deleted, is confirmed (step S3). When it has not been set that connect_condition=1, that is, when seamless play has been set, the process proceeds to step S4, where, in the play item #M+n, seamless play that has been set as a connection condition with the immediately preceding play item is released. More specifically, the connect_condition is corrected to 1.

Next, it is checked whether or not M is 0, that is, whether or not the section to be deleted is started from the beginning of the playlist and there is an entry mark matching IN_time of the play item #M+n (step S5). When this check result is negative, it follows that no playlist mark exists at the beginning of the playlist after deletion is performed. Therefore, an entry mark matching IN_time of the playlist #M+n is added (step S6). This process is needed because a playlist mark is necessary at the beginning of the playlist.

Next, the value of the sequence number_to_playitem_id of the corresponding play item, which is possessed by the entry marks contained in the play item #M+n and subsequent items, which are the play items at and subsequent to the section to be deleted, is decreased by the number n of the play items to be deleted, so that the sequence number at which the section is deleted and subsequent sequence numbers become consecutive (step S7).

Next, in the play item( ) loop of the playlist containing the play item #M, which is a play item at the beginning of the section to be deleted, n play items from the play item #M are deleted (step S8).

Next, the entry mark contained in each play item to be deleted is deleted (step S9), and the process for deleting play items is completed.

C-2. Editing of Deleting Clip AV Stream

When the editing of deleting a play item is to be performed in the real playlist, destructive editing involving the deletion of a clip AV stream file is performed. In the following, a process for performing editing to delete a clip AV stream will be described.

When a clip AV stream is to be deleted (and divided), a method of determining a frame boundary to be divided becomes a problem.

As is well known in this field of industry, in the AVC (and MPEG) method, a GOP (Group of Pictures) structure in which several image planes are collected is adopted, so that random access is made possible in units of GOPs. Image planes of different types of I/IDR pictures that are subjected to intra-frame coding, P pictures that are subjected to inter-frame forward predictive coding, and B pictures that are subjected to bidirectional predictive coding are arranged in a predetermined rule in the GOP.

Figure 10:
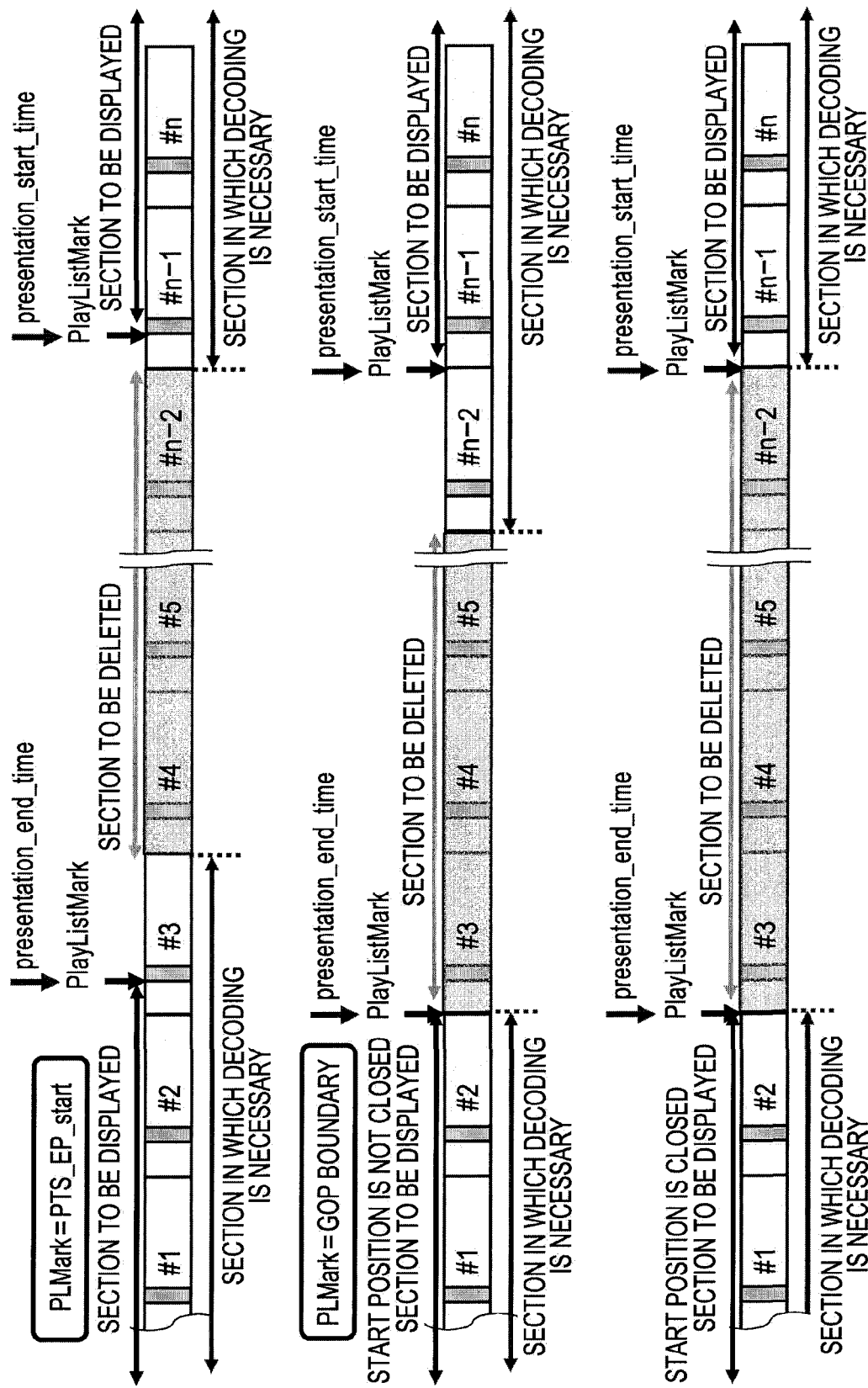
FIG. 10 illustrates a method of determining a position at which a clip AV stream is divided.

For this reason, when some sections are to be deleted from an AVC stream, if they are deleted at a position of any image plane, a problem occurs. The inventors of the present invention have considered that, as an example of an appropriate division boundary, a GOP boundary is preferably determined at the boundary of start and stop of recording, and other than that, a deletion section is preferably determined by attaching a playlist mark (PLM) to PTS_EP_Start (refer to FIG. 10).

As has been described with reference to FIG. 2, the clip information file, which defines the attributes of the clip AV stream file, exists in one-to-one correspondence with the clip AV stream file, and information on a stream, which is necessary to reproduce a real stream, is described therein. Therefore, when a specific section of a stream is to be deleted, it is necessary to achieve consistency in a clip information file corresponding to the stream that is left after deletion is performed.

Since a method of handling the connection condition flag (is_cc_5) in the clip information file, which is involved with the deletion editing of a playlist, has already been described in detail, the description thereof is omitted herein.

Since several pieces of time stamp information are used in an MPEG-TS stream, when a specific section of a stream is to be deleted, it is necessary to achieve consistency in time stamp information in the stream that is left after deletion is performed.

The MPEG-TS stream is formed by being divided into TS packets, and it is necessary to adjust a time interval at which TS packets are input to a decoding buffer with consideration of the status of the buffer. Therefore, a time stamp ATS regarding a data arrival time has been inserted into each TS packet. An ATS is attached to a TS packet on the basis of the counter value generated by the ATC counter. For example, in one stream file, the ATS monotonically increases and has a single ATC (described above).

Figure 11:
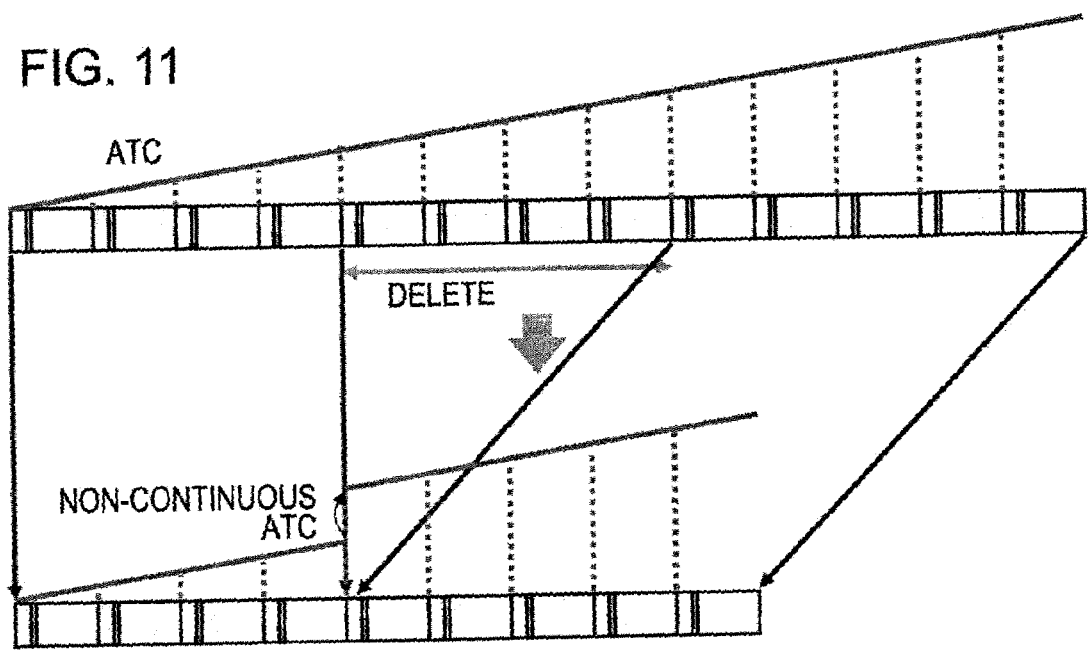
FIG. 11 shows a state in which an intermediate portion of a clip AV stream is deleted to connect streams in front of and behind the intermediate portion, and an ATC becomes non-continuous.

When a section to be deleted is an intermediate portion of a clip AV stream, after deletion is performed, a stream of the sections before and after that remains on the recording medium. At this point, when the first half and the second half of the portion that is left after deletion is performed are simply connected with each other, the ATS becomes non-continuous, and having a single ATC in the clip AV stream file cannot be maintained (refer to FIG. 11).

Figure 12:
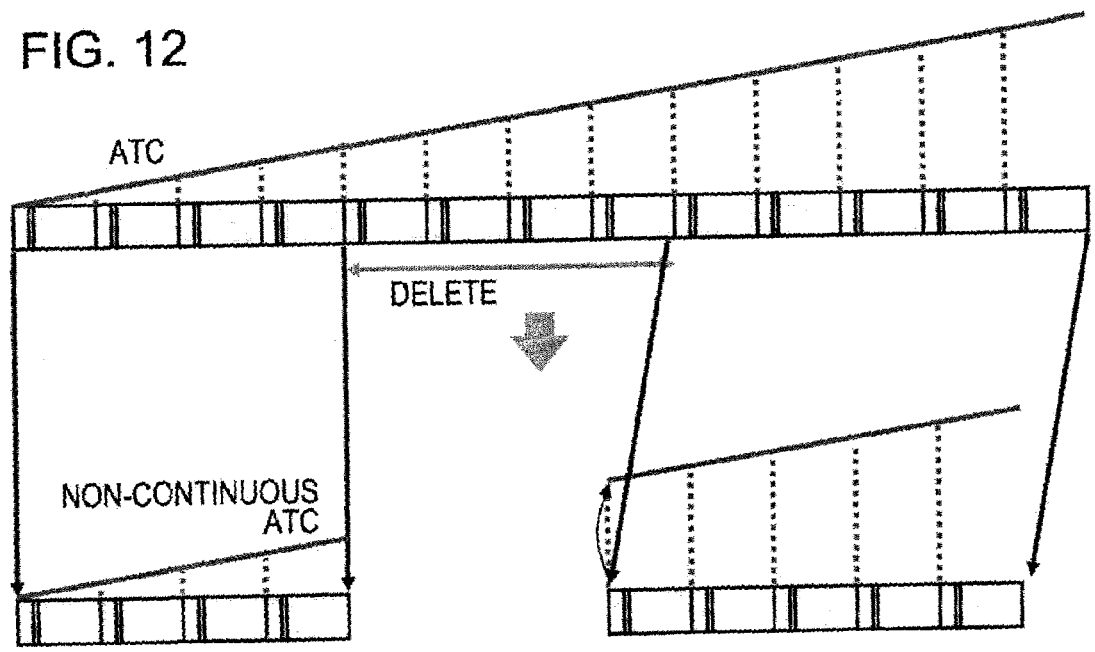
FIG. 12 shows a state in which an intermediate portion of a clip AV stream is deleted so that the clip AV stream is divided into two files on the forward side and on the backward side.

Accordingly, in this embodiment, when an intermediate portion of a clip AV stream is deleted by destructive editing, the remaining portions are not connected, and the original AV stream is divided into two files in the deletion section (refer to FIG. 12). In this case, in individual clip AV stream files, the ATS monotonically increases, and having a single ATC can be maintained. In this case, at the beginning of the clip AV stream file on the backward side, the ATC has an offset, but if the ATC is continuous, the AVCHD standard format is not conflicted with.

According to the MPEG2 system specification, in order to achieve synchronization between audio and movie packets, two types of time stamp information, that is, a PTS (Presentation Time Stamp) and a DTS (Decoding Time Stamp), are used.

The PTS is time management information (more specifically, time information on playback output of each picture of an AVC stream) on data reproduction, which is selected according to an MPEG encoding method used. When a reference synchronization signal, such as an STC (System Time Clock), which is generated by a reference decoder of the MPEG2 system, becomes equal to the PTS, related audio and movie data are reproduced and output. The DTS is time management information in data decoding. When the PTS and the DTS are not the same as each other, these are sequentially contained in the packet data. If they are the same, only the PTS is contained in the packet data.

The STC is a reference clock described using a PTS, a DTS, or the like. When a section to be deleted is an intermediate portion of a clip AV stream, the STC also becomes non-continuous in the same manner as for the ATS. Since the STC is permitted to have non-continuous points in one clip AV stream file (refer to FIG. 13), regarding the deletion of a section in a stream, a process for deleting the relevant section may be performed (to be described later).

Figure 14:
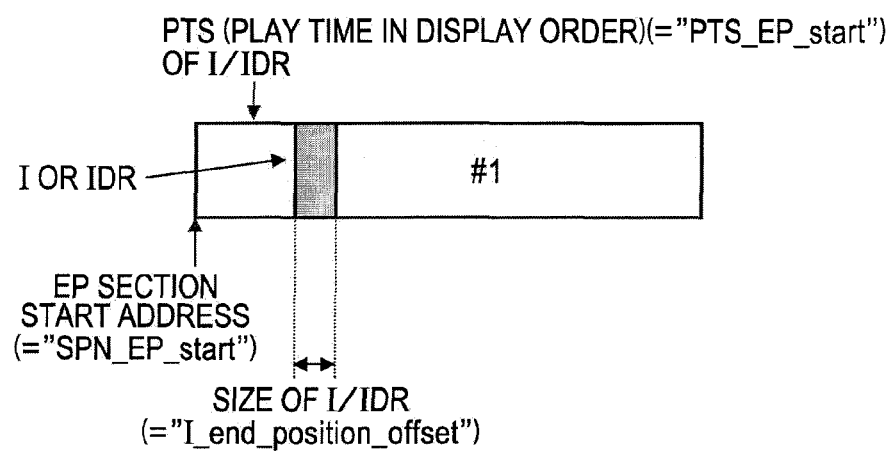
FIG. 14 illustrates EP information contained in a clip information file.

The clip information file has a correspondence table between times and addresses of clip AV streams for the purpose of accessing a clip AV stream at the time of playback. A minimum unit to be managed is called an "EP (entry point)", and is usually formed of an integral multiple of GOPs (refer to FIG. 14). (EP is a random-accessible position and, for example, if the position of an I picture of a clip AV stream is denoted as EP, random-access playback can be performed from an I picture). The structure in which information on each EP is arranged by an amount corresponding to the entire corresponding clip AV stream is "EP_map". When some sections of a clip AV stream are deleted by deletion editing, there is no need to correct the PTS (time information). Regarding the SPN (offset from the beginning), it is not necessary to correct the offset in the forward portion of the deletion section (refer to FIG. 15). In the backward portion from the deletion section, it is necessary to correct the offset from the beginning address (SPN_EP_start) of the EP section by an amount corresponding to the deletion section (refer to FIG. 16).

Figure 13:
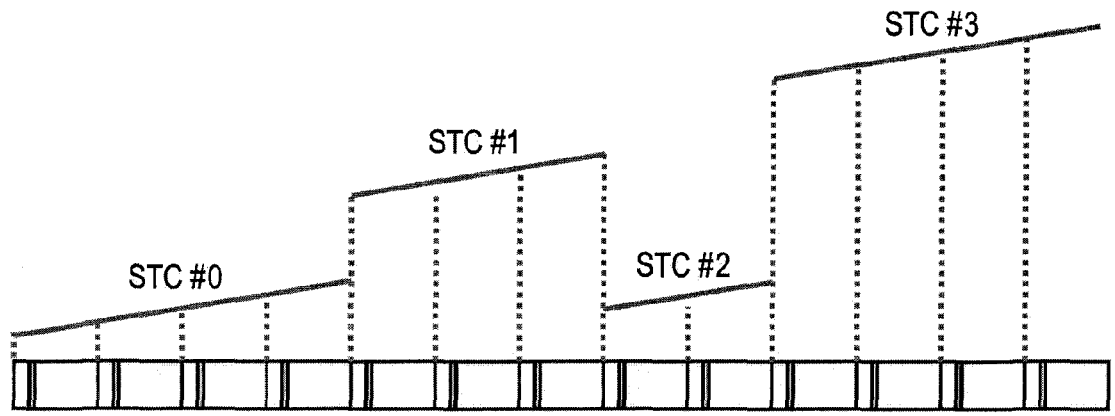
FIG. 13 shows a state in which an STC sequence contains a non-continuous point in a clip information file.
Figure 17:
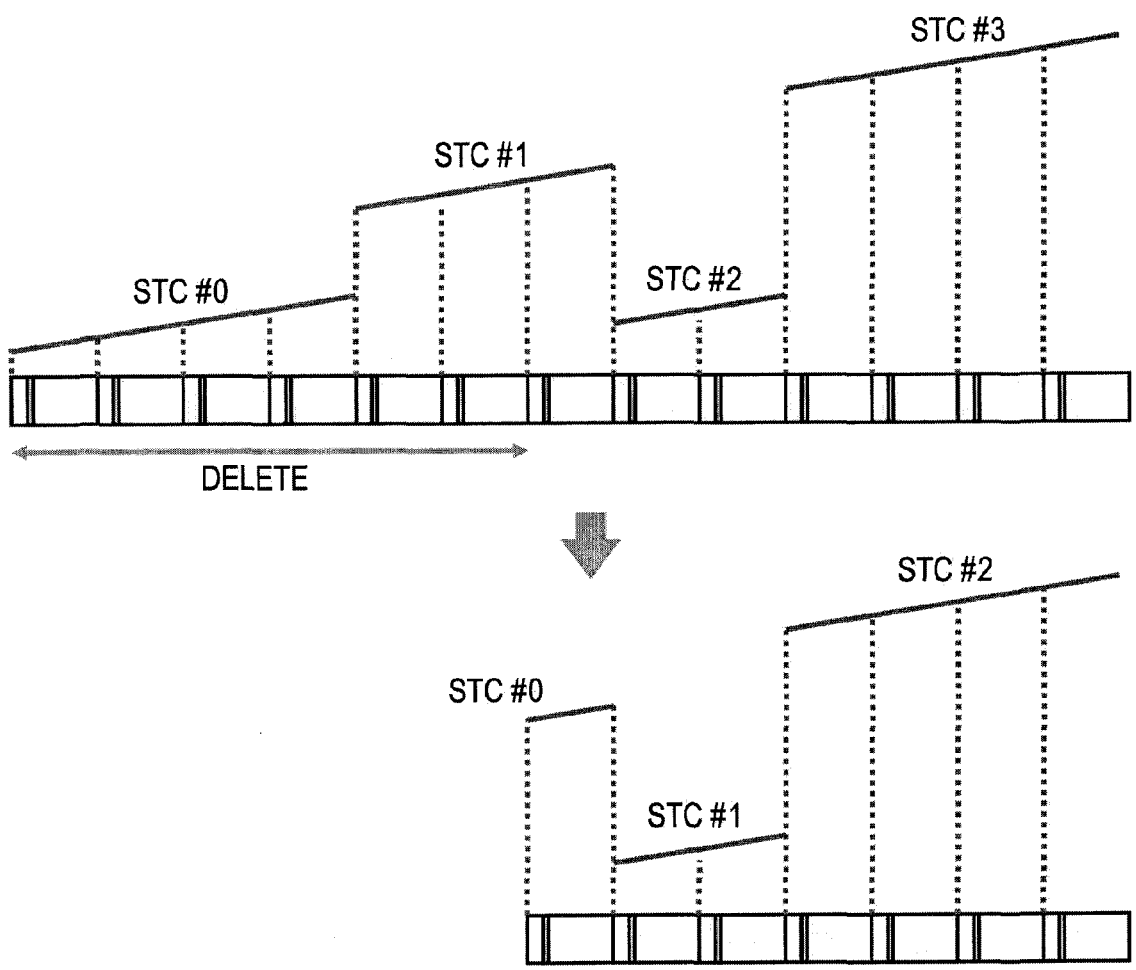
FIG. 17 shows a state in which, when the forward side of a clip AV stream file is deleted, an offset (SPN_STC_start) from the beginning within the STC sequence at and subsequent to the deletion position is corrected by an amount corresponding to the length of the deletion section.

The STC may have a non-continuous point in one file (refer to FIG. 13). Since information on each EP section is managed as an STC sequence in the clip information file, when the forward portion of the clip AV stream is to be deleted, it is necessary to correct the STC sequence as a result of the deletion of the clip AV stream. More specifically, when the deletion position is not an STC sequence boundary, the STC sequence is divided. Then, the STC sequence preceding the deletion position is deleted, and the offset (SPN_STC_start) from the start of the STC sequence succeeding the deletion position is corrected by the length corresponding to the deletion section (refer to FIG. 17).

The virtual playlist is a playlist used to create a user-defined playlist by nondestructive editing. A real playlist for the original title of the clip AV stream referred to from the virtual playlist always exists. In other words, when a section that is in a real playlist is to be edited, there is a possibility that a virtual playlist that refers to the same section exists. As a result of deletion editing in the real playlist, when the relevant section of the clip AV stream is deleted, an influence is also exerted on the virtual playlist that refers to the same section. Therefore, when a real playlist is to be deleted, it is necessary to achieve consistency between the real playlist and the virtual playlist by performing a process for searching for a virtual playlist that refers to a deletion section and for correcting the relevant play item.

Figure 18:
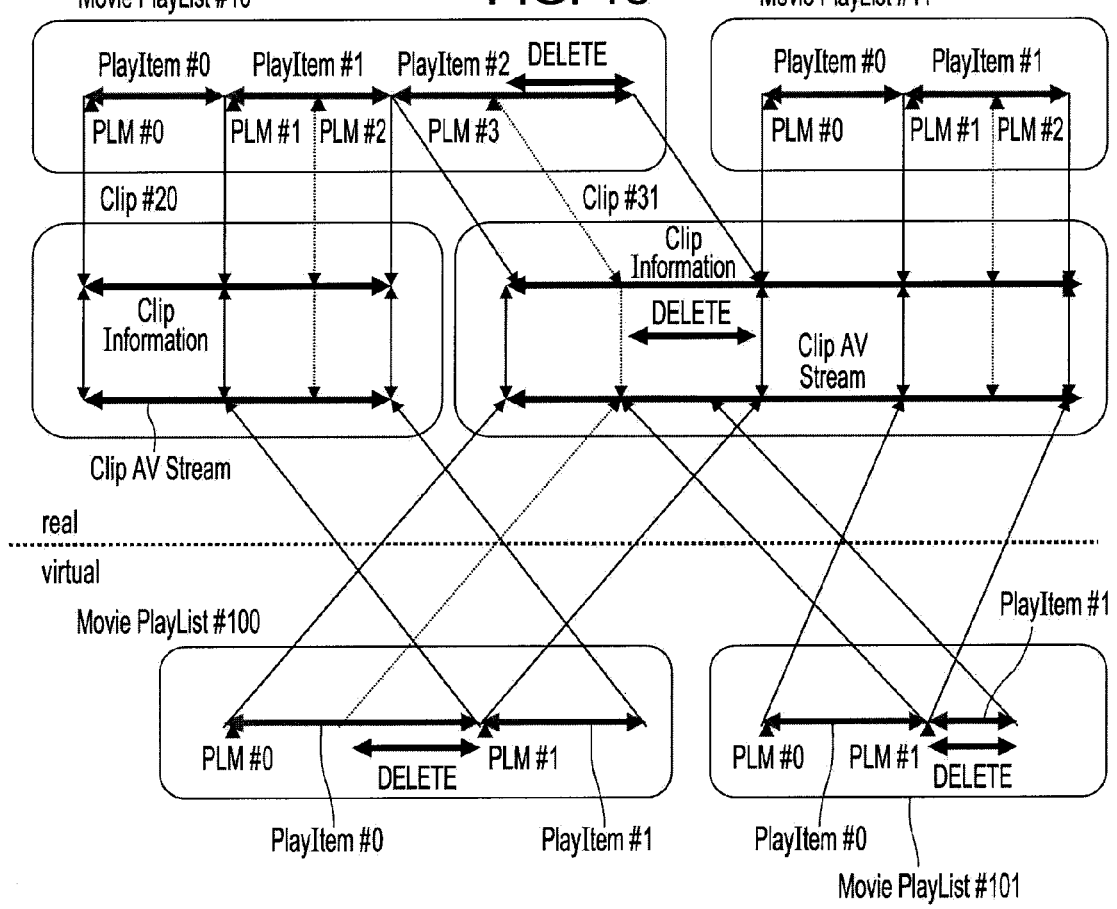
FIG. 18 shows a state in which, when a real playlist is to be deleted, a virtual playlist that refers to the same section is deleted.
Figure 19:
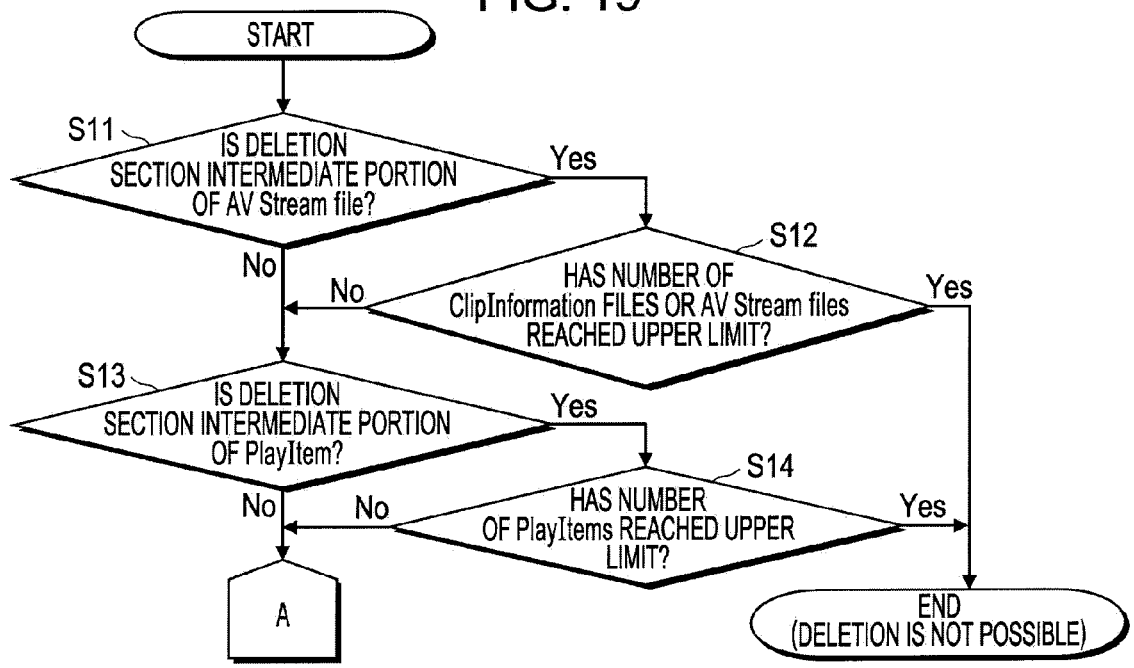
FIG. 19 is a flowchart showing a processing procedure for making an upper-limit check of the total number of play items and the total number of clip AV stream files when a play item and a clip AV stream file are to be deleted.
Figure 20:
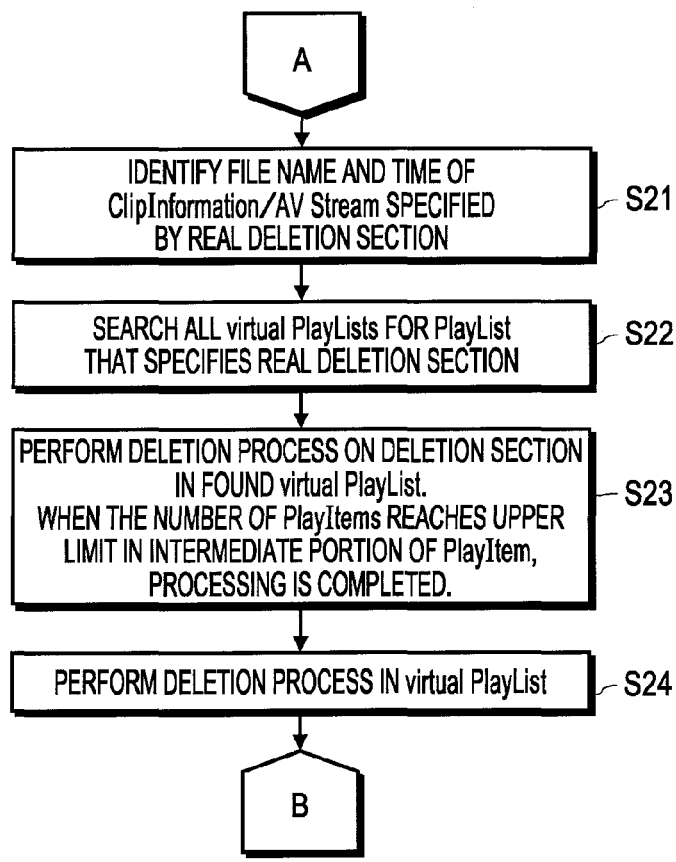
FIG. 20 is a flowchart showing a procedure of a correction process on a virtual playlist that indicates a deletion section, which is performed prior to a process for deleting a clip AV stream file.
Figure 21:
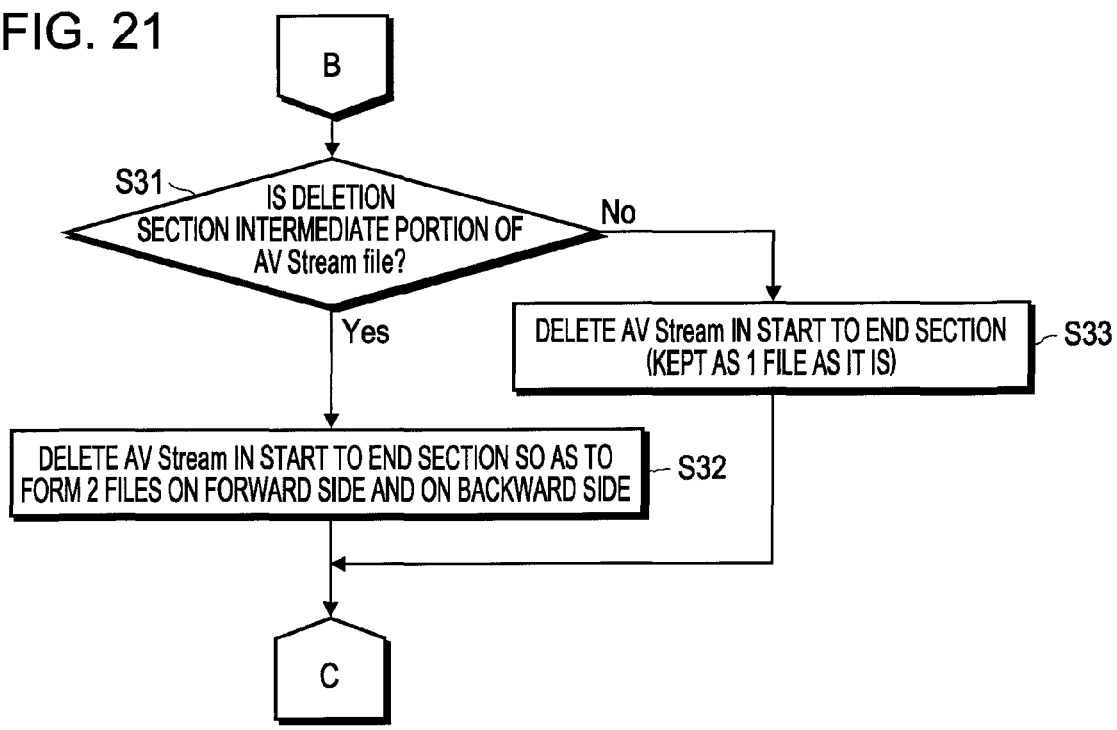
FIG. 21 is a flowchart showing a procedure of performing a process for deleting a clip AV stream on the real playlist side.
Figure 22:
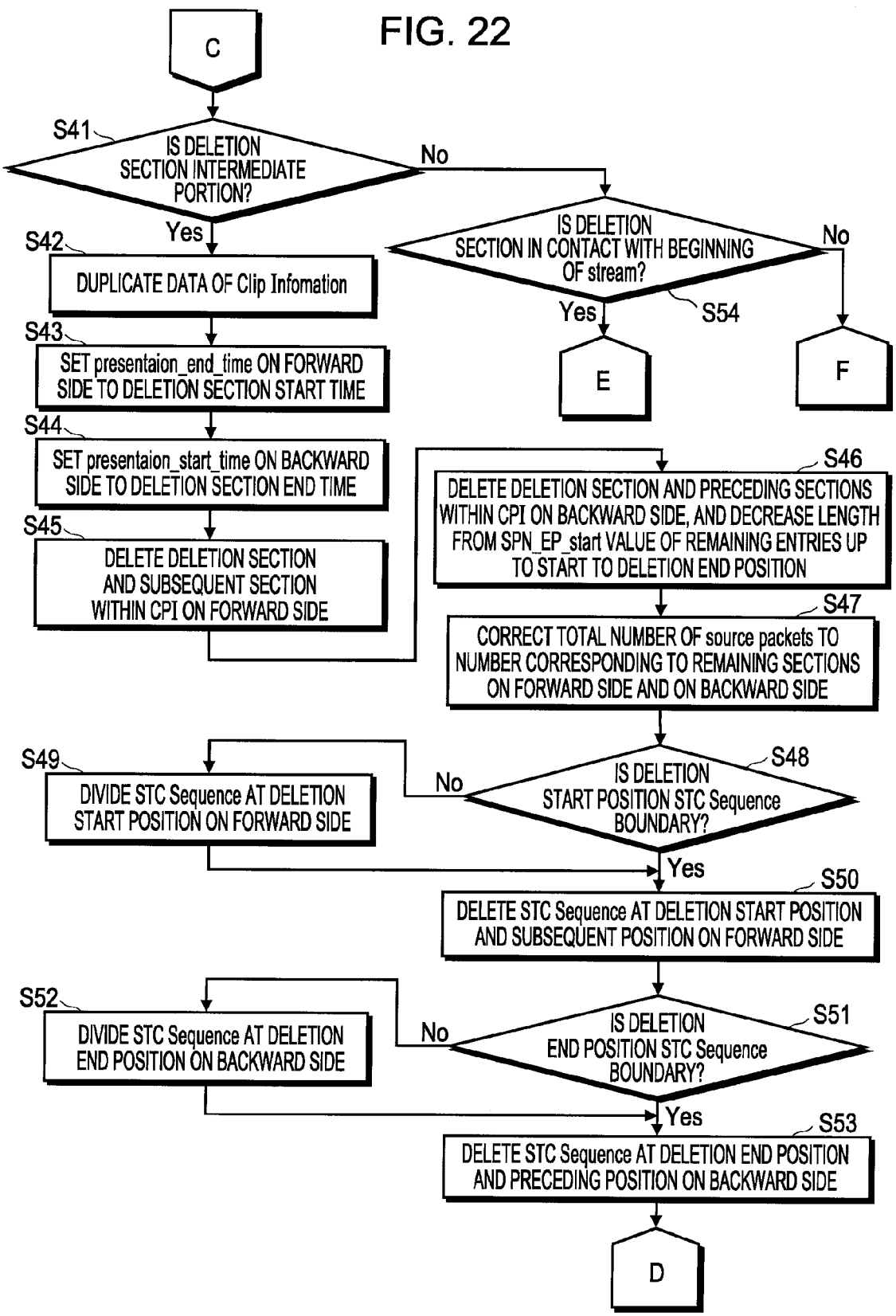
FIG. 22 is a flowchart showing a procedure of performing a process for deleting a clip information file that forms a pair with a clip AV stream file.
Figure 23:
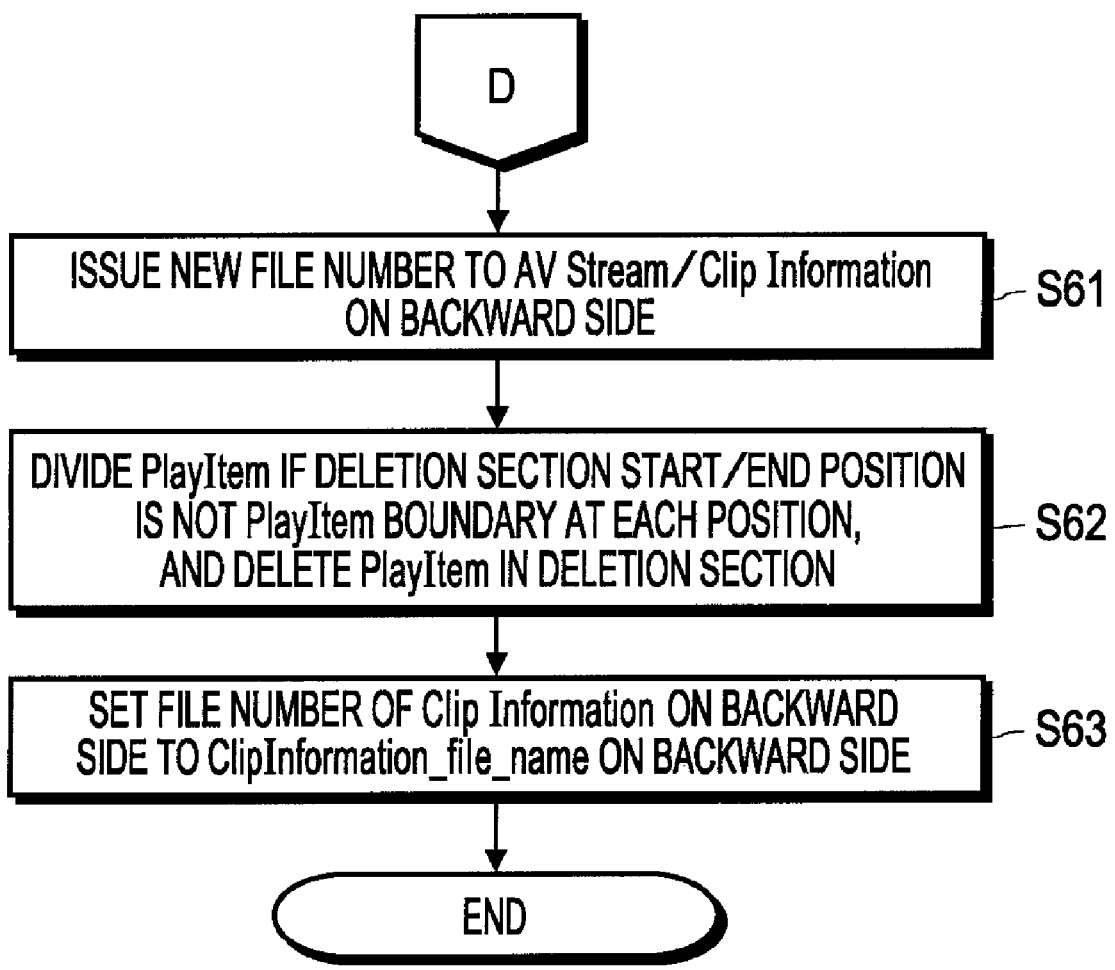
FIG. 23 is a flowchart showing a procedure of performing a process for deleting a real playlist when a deletion section is an intermediate portion of a stream.
Figure 24:
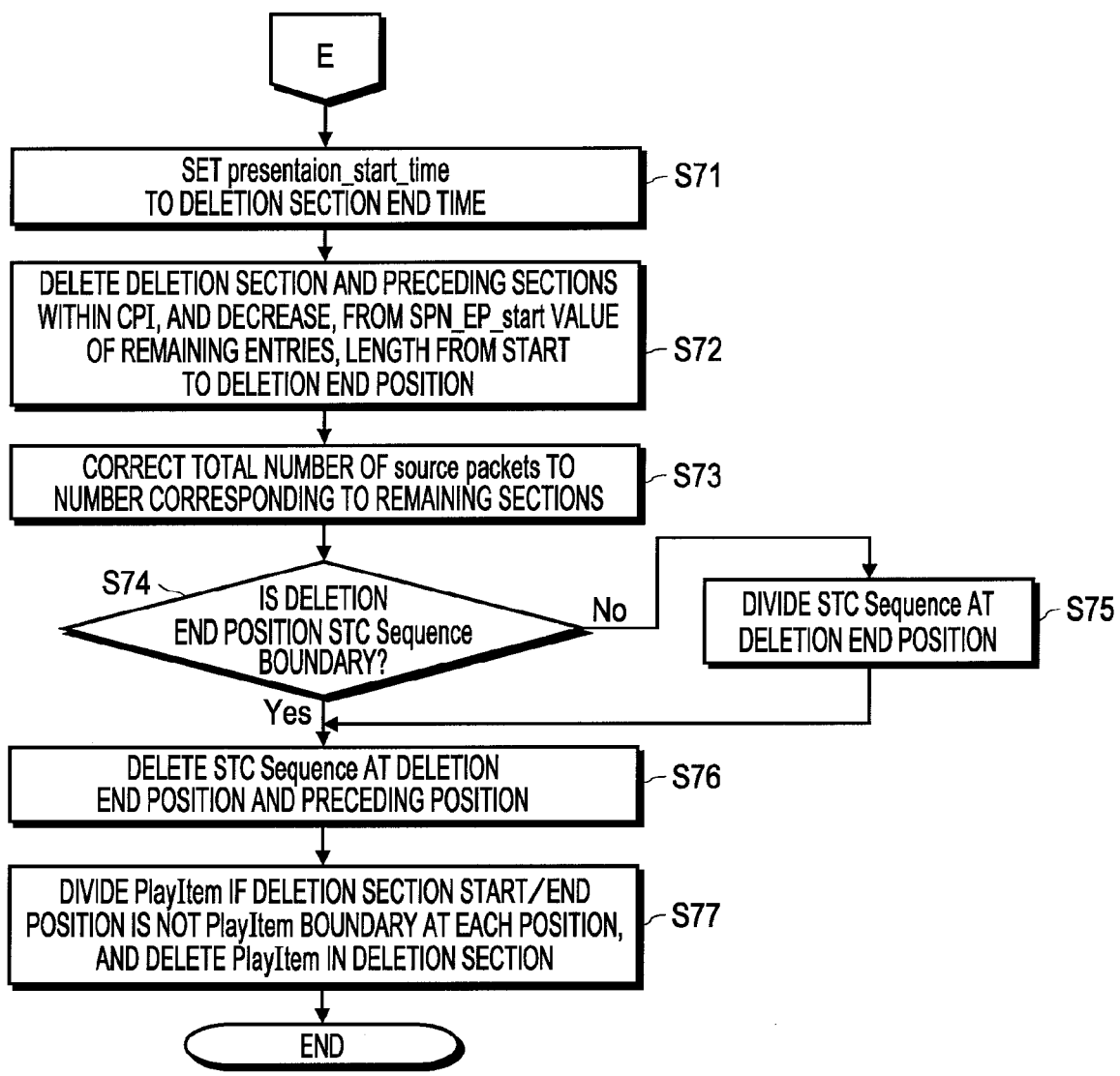
FIG. 24 is a flowchart showing a procedure of performing a process for deleting a real playlist when a deletion section is at the beginning of a stream.

In the example shown in FIG. 18, on a recording medium, a movie playlist #10 and a movie playlist #11, which are real playlists serving as titles, and a movie playlist #100 and a movie playlist #101 serving as virtual playlists are stored.

The movie playlist #10 is formed of play items #0 to #2. For the play items #0 and #1, a clip AV stream stored as a clip #20 is an entity. For the play item #2, a portion of a section from the beginning of a clip AV stream stored as a clip #31 is an entity. Playlist marks (PLM) #0 to #3, indicated by Δ in the figure, are each an entry position to each chapter. Sections between adjacent playlist marks, and the section from the final playlist mark to the end of the final play item are chapters of the movie playlist #10.

The movie playlist #11 is formed of play items #0 and #1. Within the clip AV stream stored as the clip #31, the section used in the movie playlist #10 and subsequent sections are entities of the respective play items. Playlist marks (PLM) #0 to #2 indicated by Δ in the figure are entry positions to each chapter.

The movie playlist #100 is formed of play items #0 and #1. The play item #0 points to a portion of a section from the beginning of the clip AV stream stored as the clip #31. The play item #1 points to a section from an intermediate portion of the clip AV stream stored as the clip #20 to the end thereof.

Playlist marks (PLM) #0 and #1 indicated by Δ in the figure are each an entry position to each chapter.

The movie playlist #101 is formed of play items #0 and #1. The play item #0 points to a section from an intermediate portion of the clip AV stream to the end thereof. The play item #1 points to an intermediate section of the same clip AV stream. Playlist marks (PLM) #0 and #1 indicated by Δ in the figure are entry positions to each chapter.

A description will now be given of a case in which a chapter formed of a section from the mark PLM #3 of the movie playlist #10 to the end of the playlist is to be deleted. This chapter refers to a section in an intermediate portion of the clip AV stream of the clip #31. When a search for a virtual playlist that refers to the same section as that to be deleted on the real playlist side is to be performed, the second half portion of the chapter of the movie playlist #100 and the entire chapter of the PLM #1 of the movie playlist #101 are known. In such a case, the second half portion of the chapter of PLM #0 of the movie playlist #100 is deleted and also, the entire chapter of the PLM #1 of the movie playlist #101 is deleted.

As has already been described, as a result of performing deletion editing of a play item, a process for releasing the connection regarding seamless play between forward and backward play items to be newly connected on the forward side and on the backward side needs to be performed.

In the following, a description will be given, with reference to the flowcharts shown in FIGS. 19 to 25, of the procedure of a process for performing editing to delete a real playlist and a clip AV stream stored on a recording medium.

At first, it is checked whether or not a deletion section is an intermediate portion of a clip AV stream file (step S11). When the deletion section is an intermediate portion of the clip AV stream file, the clip AV stream file is divided before and after the deletion section, and the number of clip AV stream files is increased. Accordingly, it is checked whether or not the number of the clip information files or the number of the clip AV stream files has reached an upper limit defined by the system (step S12). When the upper limit has been reached, since deletion cannot be performed, the processing routine is completed.

Next, it is checked whether or not the deletion section is an intermediate portion of a play item (step S12). When the playlist mark position of a chapter specified as a deletion section does not match the boundary of the play item and the intermediate portion of the play item is a deletion section, the number of play items increases when a deletion process is performed (refer to FIG. 7B). Accordingly, it is checked whether or not the number of play items has reached the upper limit defined by the system (step S14). When the upper limit has been reached, since deletion cannot be performed, the processing routine is completed.

Following such an upper limit check, a process for correcting a virtual playlist that refers to a deletion section is performed.

At first, the file names and the time of the clip information file and the clip AV stream file pointed to by the deletion section specified by the real playlist are identified (step S21).

Next, a search for a virtual playlist that refers to the deletion section is performed with regard to all the virtual playlists on a recording medium (step S22). Since the search method does not particularly matter, the description thereof is omitted herein.

Next, a process for deleting the deletion section is performed in each of the found virtual playlists. At this point, if the number of play items has reached the upper limit value defined by the system in an intermediate portion in the play item, the processing is completed (step S23).

Next, a process for deleting a play item in the virtual playlist is performed (step S24). The deletion editing of the virtual playlist will be described later.

Following such a correction process in the relevant virtual playlist, a process is performed for deleting a clip AV stream on the real playlist side.

At first, it is checked whether or not the deletion section is an intermediate portion of the clip AV stream file (step S31).

If the deletion section is an intermediate portion, in order to maintain having only a single ATC (refer to FIG. 6B), an AV file is deleted in the start to end section for which deletion is specified, so that the forward side and the backward side of the deletion section are divided into different files (step S32).

When the deletion section is not an intermediate portion, that is, when the deletion is started from the beginning of the clip AV stream or when up to the end of the clip AV stream is to be deleted, the clip AV stream that is left after deletion is performed is kept as it is (step S33).

Following the deletion process on the clip AV stream file, a process is performed for deleting the clip information file forming a pair with the clip AV stream file.

At first, it is checked whether or not the deletion section is an intermediate portion of the clip AV stream file (step S41).

When the deletion section is an intermediate portion of the clip AV stream file, the clip AV stream file is divided into two files before and after the deletion section. Along with this, the clip information file is divided. In this case, the data of the clip information file is duplicated (step S42). The start time of the playback end time (presentation_end_time) is written into one of the clip information files, which is on the forward side of the deletion section (step S43). The end time of the deletion section is written into the playback start time (presentation_start_time) of the other clip information file, which is on the backward side of the deletion section (step S44).

Next, the deletion section and subsequent sections within the CPI of one of the clip information files, which is on the forward side of the deletion section, are deleted (step S45). The deletion section and preceding sections within the CPI of the other clip information file, which is on the backward side of the deletion section, are deleted and also, with regard to the remaining entries, the SPN_EP_start value is decreased by the length from the beginning of the original file to the deletion end position in order to correct the offset from the beginning (step S46)(refer to FIG. 15). Then, for the clip information files on the forward side and on the backward side, the total number of source packets is corrected to the amount of the remaining sections (step S47).

Next, a process is performed for achieving consistency in the STC sequence as a result of the partial deletion of the clip information file. When the deletion start position is not a boundary of the STC sequence (step S48), the STC sequence is divided at the deletion start position of one of the clip information files, which is on the forward side of the deletion section (step S49), and the STC sequence subsequent to the deletion start position is deleted (step S50). When the deletion end position is not a boundary of the STC sequence (step S51), the STC sequence is divided at the deletion end position of the other clip information file, which is on the backward side of the deletion section (step S52), and the STC sequence at and preceding the deletion end position are deleted (step S53).

The deletion editing of the clip AV stream file and the clip information file is performed and thereafter, a process is performed for deleting the real playlist.

At first, a new file number is issued to the other clip AV stream file and the other clip information file, which is on the backward side of the deletion section (step S61).

When the start position or the end position of the deletion section is not the boundary of the play item, the play item is divided before and after the deletion section (refer to FIG. 7B), and the play items of the deletion section are deleted (step S62).

The file number of the clip information file, which was issued in step S61, is set in the clip information file name (clip information_file_name) that is referred to by the play item on the backward side, which was created by being divided (step S63), and the deletion editing process is completed.

When the deletion section of the clip AV stream file is not an intermediate portion of the stream (No in step S41), it is checked whether or not the deletion section is in contact with the beginning of the clip AV stream (step S54).

When the deletion section is in contact with the beginning of the clip AV stream (Yes in step S54), at first, the deletion section end time is written into the playback start time (presentation_start_time) of the clip information file (step S71).

Next, the section at and preceding the deletion section within the CPI is deleted, and the SPN_EP_start value is decreased with regard to the remaining entries by an amount corresponding to the length of the deletion section in order to correct the offset from the beginning (step S72).

Next, the total number of source packets is corrected to the amount of the remaining sections (step S73).

Next, a process is performed for achieving consistency in the STC sequence as a result of the partial deletion of the clip information file. More specifically, when the deletion end position is not the boundary of the STC sequence (step S74), the STC sequence is divided at the deletion end position (step S75), and the STC sequence at and preceding the deletion end position is deleted (step S76).

Finally, a process is performed for deleting a play item (step S77). When the deletion end position is not the boundary of the play item, the play item is divided before and after the deletion section (refer to 7B), and the play items of the deletion section are deleted.

On the other hand, when the deletion section is not in contact with the beginning of the clip AV stream, that is, when it is in contact with the end of the clip AV stream (No in step S54), at first, the start time of the deletion section is written into the playback end time (presentation_end_time) of the clip information file (step S81).

Next, the deletion section and subsequent sections within the CPI are deleted (step S82), and the total number of source packets is corrected to the number corresponding to the remaining sections (step S83).

Next, a process is performed for achieving consistency in the STC sequence as a result of the partial deletion of the clip information file. More specifically, when the deletion start position is not the boundary of the STC sequence (step S84), the STC sequence is divided at the deletion start position (step S85), and the STC sequence at and subsequent to the deletion start position is deleted (step S86).

Finally, a process is performed for deleting a play item (step S87). When the deletion start position is not the boundary of the play item, the play item is divided before and after the deletion section (refer to FIG. 7B), and the play items of the deletion section are deleted.

Since the virtual playlist is a playlist such that a user-defined playlist is created by nondestructive editing, the deletion editing is nondestructive editing that does not involve the deletion of the entities of the clip AV stream file and the clip information file forming a pair therewith (refer to FIG. 5).

Figure 25:
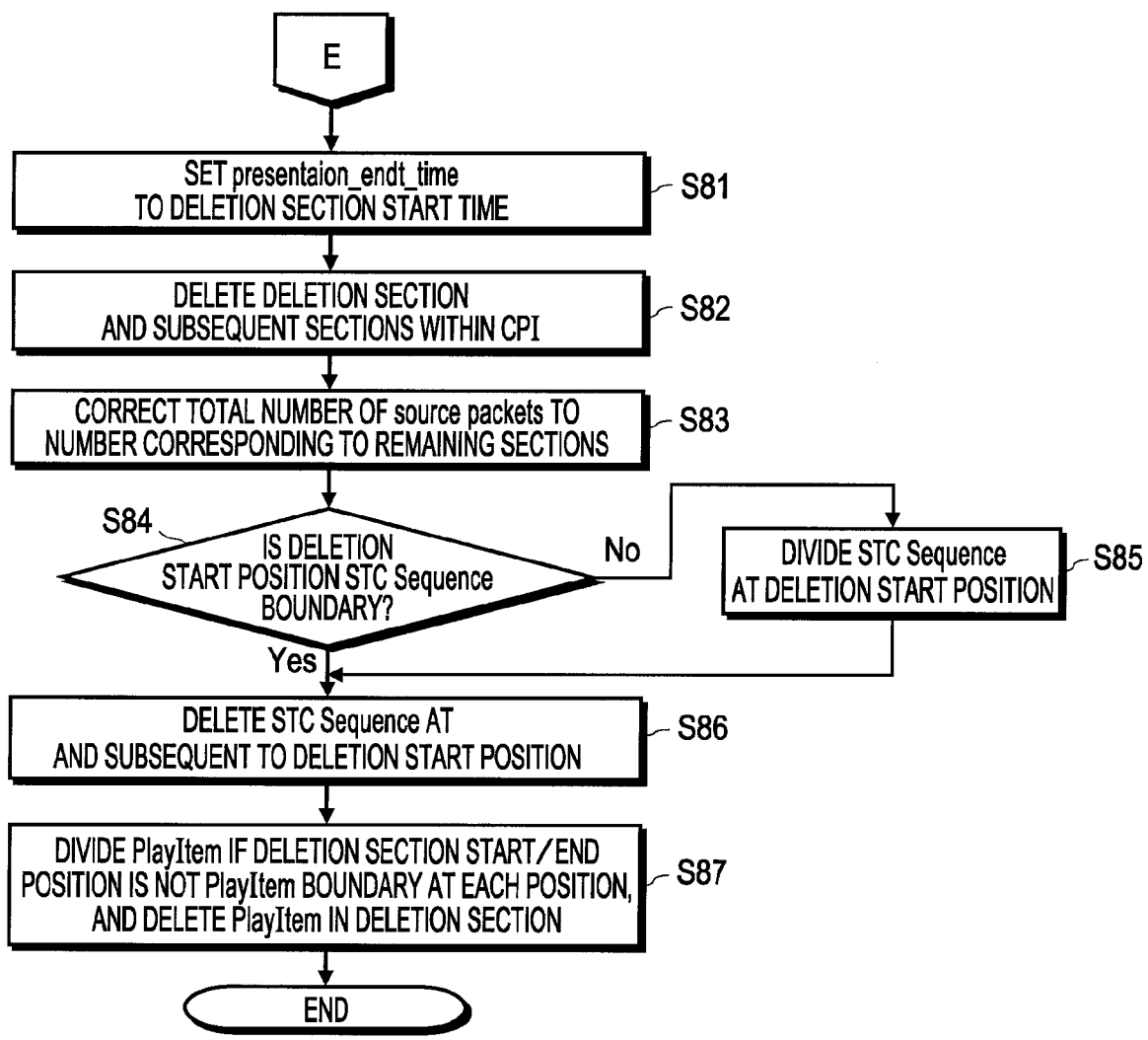
FIG. 25 is a flowchart showing a procedure of performing a process for deleting a real playlist when a deletion section is at the end of a stream.
Figure 26:
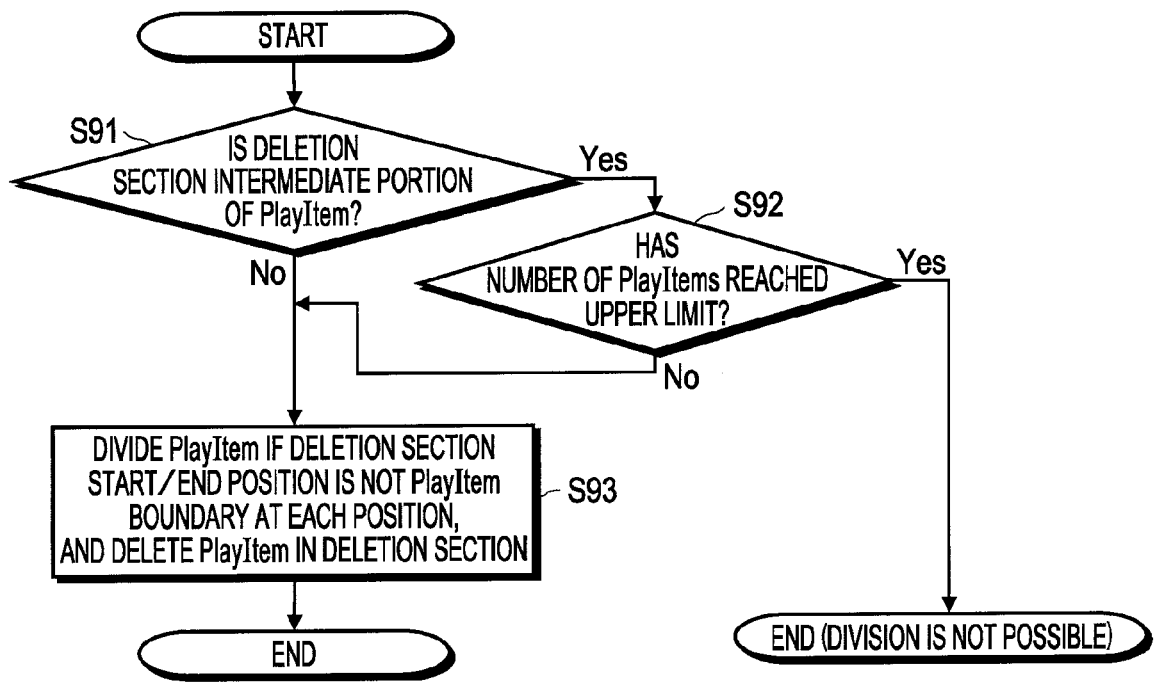
FIG. 26 is a flowchart showing a processing procedure for performing editing of deleting a virtual playlist.

FIG. 25 shows, in a flowchart, a processing procedure of performing editing to delete a virtual playlist. This processing procedure is performed in, for example, step S25 of the flowchart shown in FIG. 20.

At first, it is checked whether or not the deletion section is an intermediate portion of the play item (step S91). When the deletion section is an intermediate portion of the play item, the play item is divided before and after the deletion section, and the total number of play items on a recording medium is increased (refer to FIG. 7B). Therefore, it is checked whether or not the total number of play items has reached an upper limit defined by the system (step S92). When the total number of play items has reached the upper limit, since deletion cannot be performed, this processing routine is completed.

On the other hand, when the deletion section is in contact with the beginning or the end of the play item (No in step S91), and when the deletion section is an intermediate portion of the play item and there is a margin to the total number of play items (No in step S92), the play items are deleted in the specified deletion section (step S93). At this time, when the start position or the end position of the deletion section is not the boundary of the play item, division is performed at the start position or the end position of the deletion section, and the play item of the deletion section is deleted.

INDUSTRIAL APPLICABILITY

Up to this point, the present invention has been described in detail while referring to the specific embodiments. However, it is obvious that a person skilled in the art can modify or substitute the embodiments within the spirit and scope of the present invention.

In this specification, a description has been given with emphasis on an embodiment in which deletion editing is performed while obeying the AVCHD standard of a clip AV stream recorded on a recording medium in accordance with the AVCHD standard. However, the gist of the present invention is not limited to the embodiments. The present invention can be similarly applied when an editing process is performed on a recording medium recorded in a data format in which a clip information file forming a pair with a stream file, in which information on a stream, which is necessary to reproduce the stream, is described, exists, and the data format containing a playlist formed in such a manner that play items, in which information necessary to reproduce the playback section of a relevant stream file is described, are arranged along the time axis.

In summary, the present invention has been disclosed in the form of examples, and should not be construed as being limited thereto. In order to determine the gist of the present invention, the claims should be taken into consideration.

The invention claimed is:

1. An information processing apparatus for performing editing control of one or more audio-video streams, comprising:
an editing control unit configured to edit
an attribute definition file that defines attributes of an audio-video stream, and
a playlist formed of a plurality of pieces of playback section data that specify a playback section of the audio-visual stream at a play start point and at a play end point; and
a deletion/editing unit configured to perform a deletion/editing process on a piece of the playback section data of a relevant deletion section in response to a deletion/editing instruction from a user, wherein each piece of playback section data includes a specification of a connection condition with a previous piece of playback section data, the connection condition indicating whether seamless play is possible, each attribute definition file includes a specification of a connection condition with a next piece of playback section data, the connection condition indicating whether seamless play is possible, and the editing control unit is configured to determine whether or not the connection condition of the piece of playback section data to be deleted by the deletion/editing unit indicates that seamless play is possible, and if it is determined that seamless play is possible, to correct the specification of the connection condition of an attribute definition file corresponding to the next piece of playback section data to indicate that seamless play is not possible.

2. The information processing apparatus according to claim 1, wherein the playlist includes one or more marks serving as an entry position along the time axis at which a user may randomly access the pieces of playback section data arranged therealong, a section between adjacent marks and a section from a final mark to an end of a final piece of the playback section data each constitutes a chapter, and the deletion/editing instruction from the user is performed in units of chapters.

3. The information processing apparatus according to claim 2, wherein the playlist includes a real playlist for an original title, the real playlist is formed in such a manner that a corresponding section of the attribute definition file is sequentially registered in one or more pieces of playback section data in accordance with an order in which the audio-visual stream is recorded on a recording medium, and a user-defined virtual playlist in which one or more pieces of playback section data that refers to sections of the attribute definition file registered in one of the real playlists is created by nondestructive editing.

4. The information processing apparatus according to claim 3, wherein when the user instructs the deletion of a real playlist, the deletion/editing unit is configured to delete the relevant audio-visual stream and the deletion section of the attribute definition file corresponding to the audio-visual stream, and thereafter deletes the pieces of playback section data of the deletion section in the relevant playlist, and when the user instructs the deletion of a virtual playlist, the deletion/editing unit is configured to delete only the pieces of playback section data of the deletion section in the relevant playlist.

5. The information processing apparatus according to claim 3, wherein when a mark position of a chapter indicated as the deletion section by the user does not match a boundary of the piece of playback section data, the deletion/editing unit is configured to temporarily divide the piece of playback section data containing the deletion section at the mark position and thereafter perform the deletion/editing of the piece of playback section data contained in the deletion section.

6. The information processing apparatus according to claim 3, wherein the pieces of playback section data include the specification of the connection condition with an immediately preceding piece of playback section data, the attribute definition file includes the specification of the connection condition with the immediately succeeding piece of playback section data, and when the editing control unit deletes a piece of playback section data of an intermediate portion along the time axis in the playlist formed of three or more pieces of playback section data, the editing control unit sets the connection condition of the immediately preceding piece of playback section data in the final piece of the playback section data on the forward side, which is left after deletion is performed, to indicate that seamless play is possible and sets the connection condition of the immediately subsequent piece of playback section data in the attribute definition file at the start on the backward side, which is left after deletion is performed, to indicate that seamless play is not possible.

7. The information processing apparatus according to claim 3, wherein when there is no mark at a beginning of the playlist as a result of deleting the piece of playback section data of the deletion section, the deletion/editing unit is configured to attach a mark to the beginning of the piece of playback section data that becomes a beginning after the deletion is performed.

8. The information processing apparatus according to claim 3, wherein the piece of playback section data in the playlist includes sequence numbers that are consecutively provided along the time axis, the mark includes number reference information of the piece of playback section data to which the mark belongs, and the editing control unit is configured to correct the sequence number of the piece of playback section data to which the mark belongs to that of the mark at which a chapter that is the deletion section is deleted, and subsequent marks on the basis of the number of pieces of deleted playback section data.

9. The information processing apparatus according to claim 3, wherein the deletion/editing unit is configured to achieve consistency in the attribute definition file corresponding to the audio-visual stream that is left after deletion is performed.

10. The information processing apparatus according to claim 3, wherein the deletion/editing unit is configured to achieve consistency in the attribute definition file regarding time stamp information of the audio-visual stream that is left after deletion is performed.

11. The information processing apparatus according to claim 10, wherein when an intermediate portion of an audio-visual stream is to be deleted, the deletion/editing unit is configured to divide the original audio-visual stream into two portions at the deletion section.

12. The information processing apparatus according to claim 10, wherein the attribute definition file includes an $EP_{13}$ map in which information on each of entry points (EP) that are randomly accessible in a corresponding audio-visual stream file is arranged, and the deletion/editing unit is configured to correct an offset from the beginning by an amount corresponding to the deletion section in the $EP_{13}$ map in the portion backward from the deletion section.

13. The information processing apparatus according to claim 10, wherein
the attribute definition file includes information on each EP section that is managed as a system time clock (STC) sequence, and
the deletion/editing unit is configured to correct the STC sequence in the attribute definition file corresponding to the deletion section of the audio-visual stream file and subsequent deletion sections.

14. The information processing apparatus according to claim 10, wherein if a deletion position is not a boundary of a system time clock (STC) sequence, the deletion/editing unit is configured to divide the attribute definition file, delete the STC sequence at and preceding to the deletion position, and correct an offset from the beginning within the STC sequence at and subsequent to the deletion position by an amount corresponding to a length of the deletion section.

15. The information processing apparatus according to claim 4, wherein, when the deletion/editing of the real playlist is to be performed by destructive editing, the deletion/editing unit is configured to also perform deletion/editing of the virtual playlist that refers to the same deletion section.

16. An information processing method for performing editing control of one or more audio-video streams, comprising:
editing an attribute definition file that defines attributes of an audio-video stream, and a playlist formed of a plurality of pieces of playback section data that specify a playback section of the audio-video stream at a play start point and at a play end point; and
performing a deletion/editing process on a piece of the playback section data of a relevant deletion section in response to a deletion/editing instruction from a user, wherein
each piece of playback section data includes a specification of a connection condition with a previous piece of playback section data, the connection condition indicating whether seamless play is possible,
each attribute definition file includes a specification of a connection condition with a next piece of playback section data, the connection condition indicating whether seamless play is possible,
the step of editing includes determining whether or not the connection condition of the piece of playback section data to be deleted in the step of performing indicates that seamless play is possible, and
if it is determined that seamless play is possible, the attribute definition file corresponding to the next piece of playback section data is corrected to indicate that seamless play is not possible, in the step of performing.

17. A computer program written in a non-transitory computer-readable format so as to enable a computer to execute processing for performing editing control of one or more audio-visual streams, comprising:
editing an attribute definition file that defines attributes of an audio-video stream, and a playlist formed of a plurality of pieces of playback section data that specify a playback section of the audio-video stream at a play start point and at a play end point; and
performing a deletion/editing process on a piece of the playback section data of a relevant deletion section in response to a deletion/editing instruction from a user, wherein
each piece of playback section data includes a specification of a connection condition with a previous piece of playback section data, the connection condition indicating whether seamless play is possible,
each attribute definition file includes a specification of a connection condition with a next piece of playback section data, the connection condition indicating whether seamless play is possible,
the step of editing includes determining whether or not the connection condition of the piece of playback section data to be deleted in the step of performing indicates that seamless play is possible, and
if it is determined that seamless play is possible, the attribute definition file corresponding to the next piece of playback section data is corrected to indicate that seamless play is not possible, in the step of performing.

* * * * *